United States Patent
Glevarec et al.

(10) Patent No.: US 11,280,618 B2
(45) Date of Patent: Mar. 22, 2022

(54) POSITIONING SYSTEM, AND ASSOCIATED METHOD FOR POSITIONING

(71) Applicant: iXblue, Saint-Germain-en-Laye (FR)

(72) Inventors: Sophie Glevarec, Saint-Germain-en-Laye (FR); Jean-Philippe Michel, Saint-Germain-en-Laye (FR); Fabien Napolitano, Saint-Germain-en-Laye (FR); Guillaume Picard, Saint-Germain-en-Laye (FR); Martin Puchol, Saint-Germain-en-Laye (FR)

(73) Assignee: IXBLUE, Saint-Germain-en-Laye (FR)

( * ) Notice: Subject to any disclaimer, the term of this patent is extended or adjusted under 35 U.S.C. 154(b) by 211 days.

(21) Appl. No.: 16/567,257

(22) Filed: Sep. 11, 2019

(65) Prior Publication Data

US 2020/0088521 A1   Mar. 19, 2020

(30) Foreign Application Priority Data

Sep. 13, 2018   (FR) ...................................... 18 00973

(51) Int. Cl.
   *G01C 21/20*   (2006.01)
   *G01S 19/47*   (2010.01)
(52) U.S. Cl.
   CPC .............. *G01C 21/20* (2013.01); *G01S 19/47* (2013.01)
(58) Field of Classification Search
   CPC .......... G01C 21/20; G01C 21/16; G01S 19/47
   See application file for complete search history.

(56) References Cited

U.S. PATENT DOCUMENTS

| | | |
|---|---|---|
| 2012/0166134 A1 | 6/2012 | Yost |
| 2016/0223683 A1 | 8/2016 | Boyarski |
| 2021/0295718 A1* | 9/2021 | Robert .................... G01C 21/00 |

FOREIGN PATENT DOCUMENTS

CN   103941273 B  *  5/2017  ............. G01S 19/49

OTHER PUBLICATIONS

French Search Report, FR 1800973, dated Aug. 21, 2019.
Carlson, "Federated Square Root Filter for Decentralized Parallel Processes", IEEE Transactions on Aerospace and Electronic Systems, May 1990, vol. 26, No. 3, pp. 517-525.
Carlson, "Federated Square Root Filter for Decentralized Parallel Processes", IEEE Transactions on Aerospace and Electronic Systems vol. 26, No. 3 May 1990, pp. 517-525.

* cited by examiner

*Primary Examiner* — Brian P Sweeney
(74) *Attorney, Agent, or Firm* — Nixon & Vanderhye

(57) ABSTRACT

Disclosed is a positioning system including: several inertial measurement units; at least one common sensor, providing a measurement of a positioning parameter of a system; for each inertial measurement unit, a navigation filter configured to: a) determine an estimate of the positioning parameter, on the basis of an inertial signal provided by the inertial measurement unit; and to b) correct the estimate, as a function of the measurement and of a correction gain that is determined on the basis of an augmented variance higher than the variance of a measurement noise of a common sensor; and—at least one fusion module determining a mean of the estimates, the mean being not reinjected at the input of the navigation filters. Also disclosed is an associated positioning method.

20 Claims, 5 Drawing Sheets

Figure 1:
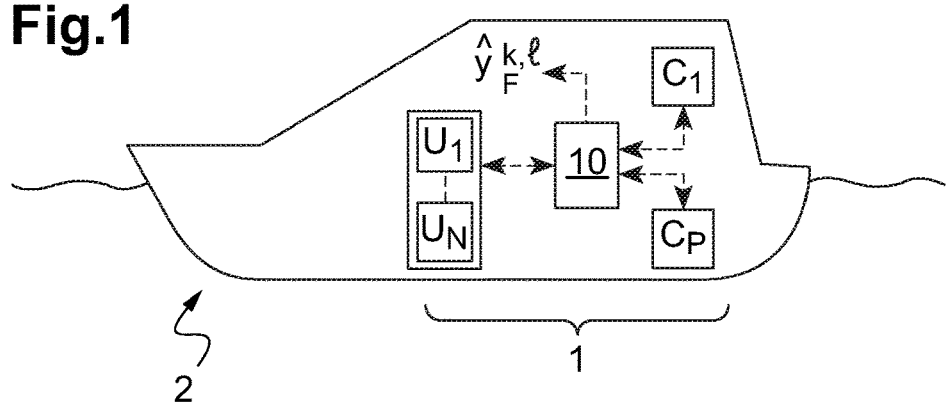

POSITIONING SYSTEM, AND ASSOCIATED METHOD FOR POSITIONING

TECHNICAL FIELD TO WHICH THE INVENTION RELATES

The present invention relates to a positioning system, and an associated positioning method.

It more particularly relates to a positioning system comprising:
- an inertial measurement unit that includes at least one accelerometer or one gyrometer,
- a sensor for measuring a positioning parameter of the system, such as a GPS ("Global Positioning System") positioning device, and
- a navigation filter, for example a Kalman filter, configured to determine an estimated positioning parameter, as a function of an inertial signal provided by the inertial measurement unit, and as a function of a measurement signal provided by the above-mentioned sensor.

TECHNOLOGICAL BACKGROUND

It is common to equip a vehicle, a ship or an aircraft with a positioning system for locating it with respect to its environment.

It is known in particular to estimate the position of a ship or an aircraft by combining pieces of information coming, on the one hand, from an inertial measurement unit comprising an accelerometer and a gyrometer, and on the other hand, from a GPS positioning device, the combination of these pieces of information being performed by means of a Kalman filter.

For that purpose, the Kalman filter:
- determines an estimated position, by time integration of an inertial signal provided by the inertial measurement unit (this operation is sometimes called "prediction step"), then
- corrects this estimated position, by adjusting it to a position measured by the GPS positioning device (this operation being sometimes called "updating step"),
- and so on, iteratively.

Such a Kalman filter makes it possible, taking into account the respective accuracies of the inertial measurement unit and the positioning device, to estimate optimally the position of the ship or of the aircraft (the estimated position mentioned hereinabove corresponding, after correction, to an optimum estimate of the real position of the ship or of the aircraft, i.e. an estimate minimizing the variance of the deviation between the estimated position and the real position of the system).

The system described hereinabove comprises a single inertial measurement unit, and a single GPS positioning device.

To improve the accuracy and reliability of such a system, it is interesting to equip it with several inertial measurement units, in the case where one of the measurement units would fail or would begin to strongly drift.

The question is then posed to know how to combine the information provided by these different inertial measurement units, so as to obtain again an optimum estimate (and herein better than that which would be obtained with a single inertial measurement unit) of the real position of the ship or of the aircraft.

For that purpose, a solution consists in:
- determining a mean inertial signal, by averaging the inertial signals coming from the different inertial measurement units, then in
- estimating the position of the ship or of the aircraft, by means of a Kalman filter as described hereinabove, receiving as an input this mean inertial signal, as well as the position measured by the GPS positioning device.

Everything goes as if the system was equipped with a single, virtual, inertial measurement unit, having an improved accuracy with respect to one of the individual inertial measurement units of the system (thanks to the averaging between the different inertial signals).

This solution may lead to an optimum estimate of the position of the ship or of the aircraft and may be implemented with limited calculation resources. On the other hand, it does not make it possible to identify a measurement unit that would be defective or that would show a strong drift, because the signals provided by the different measurement units are fused with each other (and temporally integrated), before being compared with the position measured by the GPS positioning device.

Moreover, it is known from the document Neal A. Carlson: "Federated Square Root Filter for Decentralized Parallel Processes", IEEE Transactions on aerospace and electronic systems, vol. 26, no. 3, May 1990, pages 517 to 525 (referred to hereinafter as "Carlson" document), another method for estimating the state of a navigation system, based on a set of several individual Kalman filters operating in parallel.

This system comprises several GPS positioning devices, and an inertial navigation device serving as a common reference. Each individual Kalman filter receives as an input a signal provided by one of the GPS positioning devices with which it is associated, as well as a common reference signal provided by the inertial navigation device. This filter then provides an estimate of the state vector of the navigation system.

A new whole state vector of the navigation system is then determined by calculating a weighted mean of the different state vectors respectively estimated by these individual Kalman filters.

The Carlson document then teaches that it is essential, for the whole state vector mentioned hereinabove to correspond to an optimum estimate of the state of the system, to reinject this whole state vector at the input of each individual Kalman filter and to reset the individual Kalman filter on the basis of this whole state vector at each iteration (at each iteration of the prevision and updating operations). In such a system, the individual Kalman filters hence do not operate independently from each other, which strongly limits the possibility of detecting a failure of one of the individual sensors.

OBJECT OF THE INVENTION

In order to remedy the above-mentioned drawbacks of the state of the art, the present invention proposes a positioning system comprising:
- several inertial measurement units, each inertial measurement unit comprising at least one inertial sensor, accelerometer or gyrometer, configured to provide an inertial signal representative of an acceleration or an angular speed of rotation of the inertial measurement unit, at least one common sensor, configured to provide a measurement of a positioning parameter of the system, said measurement being affected by a measurement noise, for each inertial measurement unit, an individual navigation filter configured to:
  a) determine an estimate of said positioning parameter, on the basis of the inertial signal provided by said inertial measurement unit, and to
  b) determine a corrected estimate of said positioning parameter by adding to said estimate previously determined at step a) a corrective term equal to a correction gain multiplied by a difference between, on the one hand, said measurement of the positioning parameter of the system and, on the other hand, the product of a measurement matrix multiplied by said estimate of the positioning parameter or multiplied by a sum of said estimate and an estimated error affecting said estimate, the measurement matrix representing the way said measurement depends on the positioning parameter of the system, the correction gain being determined as a function of an augmented variance that is higher than the variance of the measurement noise of the common sensor, and at least one fusion module configured to determine a mean estimate of said positioning parameter of the system by calculating a mean of a given number of said corrected estimates of said positioning parameter, said number being higher than or equal to two and lower than or equal to the number of said inertial measurement units that are included in the positioning system, the system being configured so that each individual navigation filter executes several times, successively, all the steps a) and b) without taking into account said mean estimate determined by the fusion module.

The mean calculated by the fusion module is an arithmetic mean, weighted or not.

In this system, as the mean estimate of the positioning parameter of the system is not reinjected at the input of the individual navigation filters, at least not at each calculation step, the different navigation filters operate independently from each other. It is hence possible, contrary to the solution described in the Carlson document, to detect that one of the inertial measurement units is defective, or that it has a strong drift (by comparing between each other the estimates of the positioning parameter produced by the different navigation filters). Moreover, due to this independence between filters, the positioning system may be implemented event with limited calculation means, and even if the filters do not operate synchronously.

The applicant has further observed that, surprisingly, such a positioning system without systematic reinjection of the mean estimate at the input of the individual navigation filters, may lead to an optimum estimate of the positioning parameter of the system. This surprising result goes against the teaching of the Carlson document: according to this document, the estimate of the system position is necessarily sub-optimum when the navigation filters operate independently from each other (conclusion of the Carlson document, at the end of page 524 of this document), so that this document dissuades from using individual filters without reinjection when an optimum estimate is searched for.

Moreover, it is also sufficient, in a non-limitative way, that a relative deviation between the respective signal-to-noise ratios of any two of said inertial signals respectively provided by said measurement units is lower than 30%.

The applicant has observed that using inertial measurement units having a same signal-to-noise ratio and setting each navigation filter with said augmented variance makes said mean estimate optimum. A mathematical justification of this interesting property is developed hereinafter in the description.

Using inertial measurement units having close signal-to-noise ratios, as indicated hereinabove, then ensures that said mean estimate of the positioning parameter of the system is close to an optimum estimate of the (real) positioning parameter of the system.

Other non-limitative and advantageous characteristics of the positioning system according to the invention, taken individually or according to all the technically possible combinations, are the following:

a relative deviation between said augmented variance and an optimum augmented variance is lower than 30%, said optimum augmented variance being equal to the variance of the measurement noise of the common sensor multiplied by the number of said estimates of said positioning parameter, the mean of which is calculated by the fusion module to determine said mean estimate;

the individual navigation filters are modified Kalman filters, each of these filters being configured to:
    estimate a covariance matrix $P_n^{k,i}$ of a deviation between said estimate of the positioning parameter of the system and this positioning parameter, and to
    determine said correction gain so that it has, with an optimum gain, a relative deviation lower than 30%, said optimum gain being equal to the following quantity: $P_n^{k,i} H_n^T S_n^{-1}$, where $H_n^T$ is the transposed matrix of the measurement matrix $H_n$, and where $S_n^{-1}$ is the inverse of an innovation covariance matrix $S_n$ equal to $H_n P_n^{k,i} H_n^T + V_{aug}$, $V_{aug}$ being said augmented variance;

each individual navigation filter is configured to that, during a first execution of step a), the covariance matrix $P_n^{k,i}$ of the deviation between said estimate of the positioning parameter of the system and this positioning parameter is estimated as a function of an initial covariance matrix, and of a propagation noise matrix comprising at least:
    a first component, representative of the variance of a noise affecting the inertial signal provided by the inertial measurement unit associated with said individual navigation filter, and
    a second component, representative of an augmented variance that is associated with external noises independent of said inertial measurement unit, said augmented variance being higher than and proportional to the variance of said external noises;

the positioning system further comprises, for each inertial measurement unit, a conventional Kalman filter configured to:
    determine an additional estimate of said positioning parameter of the system, on the basis of the inertial signal provided by said inertial measurement unit,
    estimate an additional covariance matrix $P_n^{1,i}$ of a deviation between said additional estimate and said positioning parameter of the system, and to
    determine a corrected additional estimate of said positioning parameter by adding to said previously determined additional estimate a corrective term equal to an additional correction gain multiplied by a difference between, on the one hand, said measurement of the positioning parameter of the system and, on the other hand, the product of the measurement matrix multiplied by said additional estimate or multiplied by a sum of said additional estimate and of an additional estimated error affecting said additional estimate, the additional correction gain being determined as a function of the variance of the measurement noise of the common sensor;

the additional correction gain is equal to the following quantity: $P_n^{1,i} H_n^T (S_n^1)^{-1}$, where $H_n^T$ is the transposed matrix of the measurement matrix $H_n$ and where $(S_n^1)^{-1}$ is the inverse of an additional innovation covariance matrix $S_n^1$ equal to $H_n P_n^{1,i} H_n^T + R_n$, $R_n$ being said variance of said measurement noise;

the positioning system further comprises an error detection module configured so as, for at least two of said inertial measurement units, to:
calculate the difference between the two corrected additional estimates of the positioning parameter that have been respectively determined on the basis of the signals provided by these two inertial measurement units,
determine an expected covariance matrix for said difference, as a function of the additional covariance matrices $P_n^{1,i}$ and $P_n^{1,j}$ of the two additional estimates that have been respectively determined on the basis of the inertial signals provided by said two inertial measurement units, and as a function of the covariance matrices $P_n^{k,i}$ and $P_n^{k,j}$ of the two estimates of the positioning parameter that have been respectively determined on the basis of these same inertial signals,
test, by means of a statistic test, if said difference is compatible, or incompatible, with said expected covariance matrix, and
in case of incompatibility, determine that an error has occurred in the operation of one of said two inertial measurement units;

said expected covariance matrix is equal to the sum of the additional covariance matrices $P_n^{1,i}$ and $P_n^{1,j}$, minus an estimate of the correlation between said corrected additional estimates, whose difference has been calculated;

said estimate of the correlation between said corrected additional estimates is determined as a function of a difference between, on the one hand, the sum of the additional covariance matrices $P_n^{1,i}$ and $P_n^{1,j}$ determined by the conventional Kalman filters (without augmented variance), and, on the other hand, the sum of the covariance matrices $P_n^{k,i}$ and $P_n^{k,j}$;

said statistic test is a khi2 test;

said expected covariance matrix is determined as a function of a corrected covariance matrix equal to $$P_n^{1,i} + P_n^{1,j} - \frac{1}{k-1}(P_n^{k,i} + P_n^{k,j} - P_n^{1,i} - P_n^{1,j}),$$

where k is the number of estimates of the positioning parameter whose mean is calculated by the fusion module to determine said mean estimate;

the fusion module is configured to determine an estimate of a covariance matrix of said mean estimate, as a function:
of an arithmetic mean of said covariance matrices $P_n^{k,i}$ respectively associated with said corrected estimates of the positioning parameter whose mean is calculated by the fusion module to determine said mean estimate, or as a function
of the inverse of an arithmetic mean of the inverses of said covariance matrices $P_n^{k,i}$ respectively associated with said corrected estimates of the positioning parameter whose mean is calculated by the fusion module to determine said mean estimate;

a relative deviation between two of said correction gains, respectively determined by any two of said individual navigation filters, is lower than 20%;

the navigation filters are synchronous;

the respective correction gains of the different navigation filters are equal to a same common correction gain whose value is, at each repetition of steps b), calculated only once for all of said navigation filters;

the inertial measurement units are N in number, and the fusion module is configured to:
determine said mean estimate of the positioning parameter of the system by calculating the mean of a set of k corrected estimates of said positioning parameter, among the N corrected estimates of this positioning parameter respectively determined by the individual navigation filters, the integer number k being lower than or equal to N, and to
determine at least another mean estimate of the positioning parameter of the system, by calculating the mean of another set of k corrected estimates of said positioning parameter among the N corrected estimates of this positioning parameter respectively determined by the individual navigation filters;

the fusion module is configured so as, for each set of k corrected estimates of said positioning parameter among the N corrected estimates of this positioning parameter determined by the individual navigation filters, to determine a mean estimate of the positioning parameter equal to the mean of the k corrected estimates of the positioning parameter included in said set;

said positioning parameter comprises one of the following magnitudes:
a longitude, a latitude, or an altitude locating the positioning system,
a component of the speed of the positioning system with respect to the terrestrial reference system,
a heading angle, a roll angle or a pitch angle of the positioning system, with respect to the terrestrial reference system;

each navigation filter is configured to determine an estimate of a state vector of the system, one of the components of this state vector being said positioning parameter, another component comprising one of the following magnitudes:
a longitude, a latitude, or an altitude locating the positioning system,
a component of the speed of the positioning system with respect to the terrestrial reference system,
a heading angle, a roll angle or a pitch angle of the positioning system, with respect to the terrestrial reference system;
a calibration residue parameter of one of the inertial measurement units, for example a residual bias of one of the accelerometers,
a gravity anomaly,
a speed of a sea current,
a calibration parameter of said common sensor,
or a deviation between one of the previous magnitudes and an estimate of said magnitude;

the positioning system comprises at least two common sensors configured to provide respectively two measurements of said positioning parameter, and wherein each individual navigation filter is configured so as, at step b), to adjust said estimate of the positioning parameter by taking into account these two measurements.

The invention also relates to a method for positioning a system, in which:

several inertial measurement units each provide an inertial signal representative of an acceleration or an angular speed of rotation of the inertial measurement unit, at least one common sensor provides a measurement of a positioning parameter of the system, said measurement being affected by a measurement noise, for each inertial measurement unit, an individual navigation filter:
  a) determines an estimate of said positioning parameter, on the basis of the inertial signal provided by said inertial measurement unit, and
  b) determines a corrected estimate of said positioning parameter by adding to said estimate previously determined at step a) a corrective term equal to a correction gain multiplied by a difference between, on the one hand, said measurement of the positioning parameter of the system, and, on the other hand, the product of a measurement matrix multiplied by said estimate of the positioning parameter or multiplied by a sum of said estimate and of an estimated error affecting said estimate, the measurement matrix representing the way said measurement depends on the positioning parameter of the system, the correction gain being determined as a function of an augmented variance that is higher than the variance of the measurement noise of the common sensor, and at least one fusion module determines a mean estimate of said positioning parameter of the system by calculating a mean of a given number of said corrected estimates of the positioning parameter, said number being higher than or equal to two and lower than or equal to the number of inertial measurement units that are included in the system, each individual navigation filter executing several times successively the set of steps a) and b) without taking into account said mean estimate determined by the fusion module.

The different optional characteristics presented hereinabove in terms of system may also be applied to the just-described method.

DETAILED DESCRIPTION OF AN EXEMPLARY EMBODIMENT

The following description in relation with the appended drawings, given by way of non-limitative examples, will allow a good understanding of what the invention consists of and of how it can be implemented.

Figure 9:
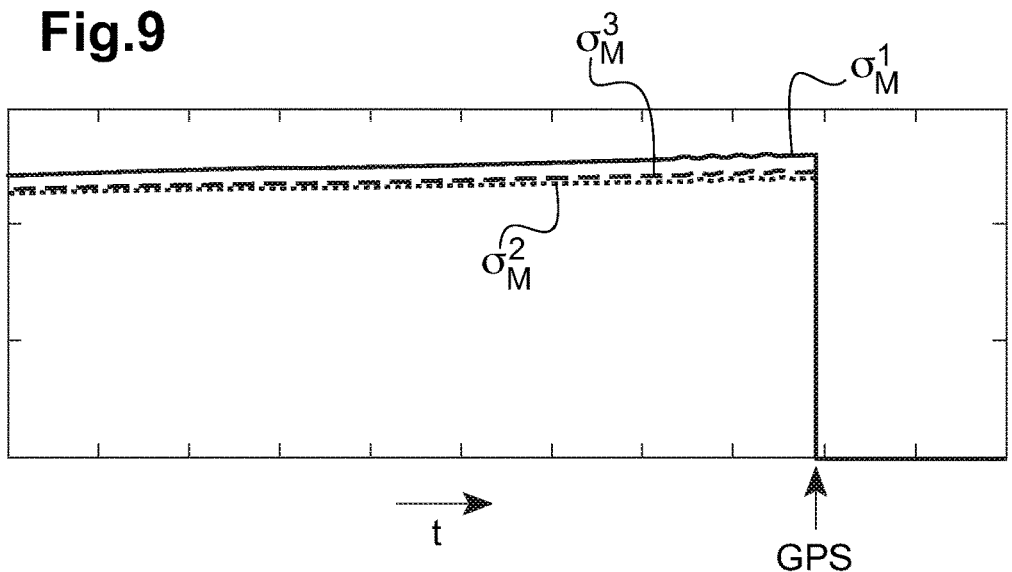
Figure 10:
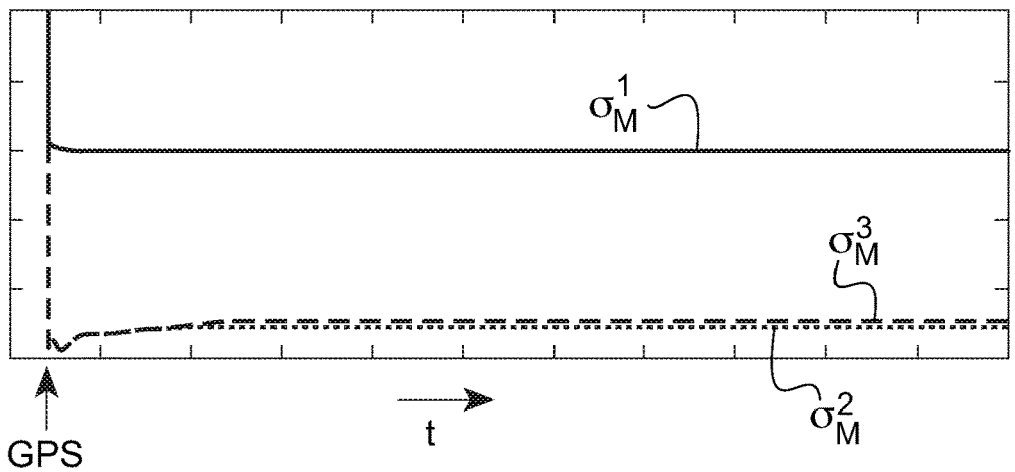
Figure 2:
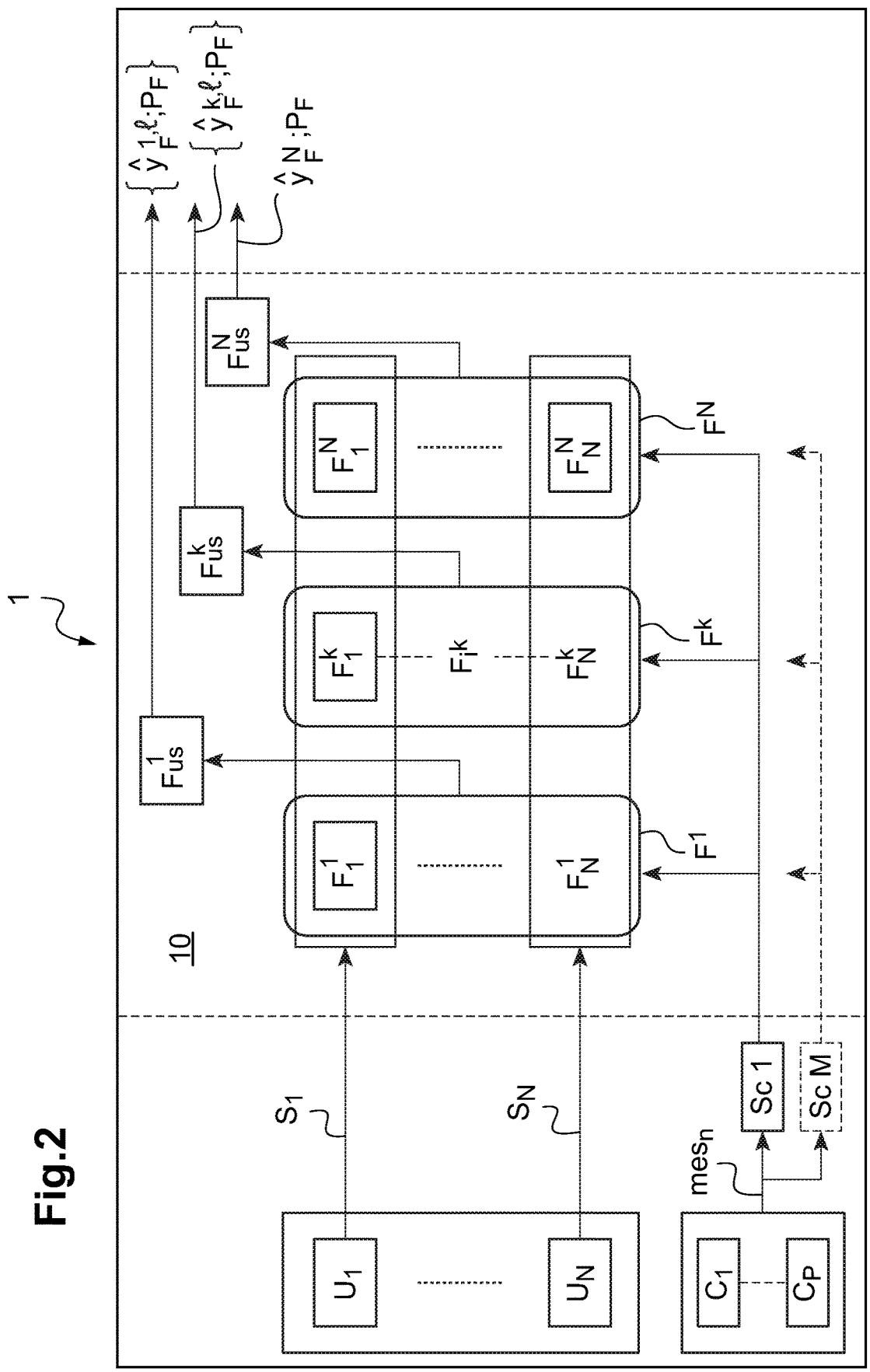
Figure 3:
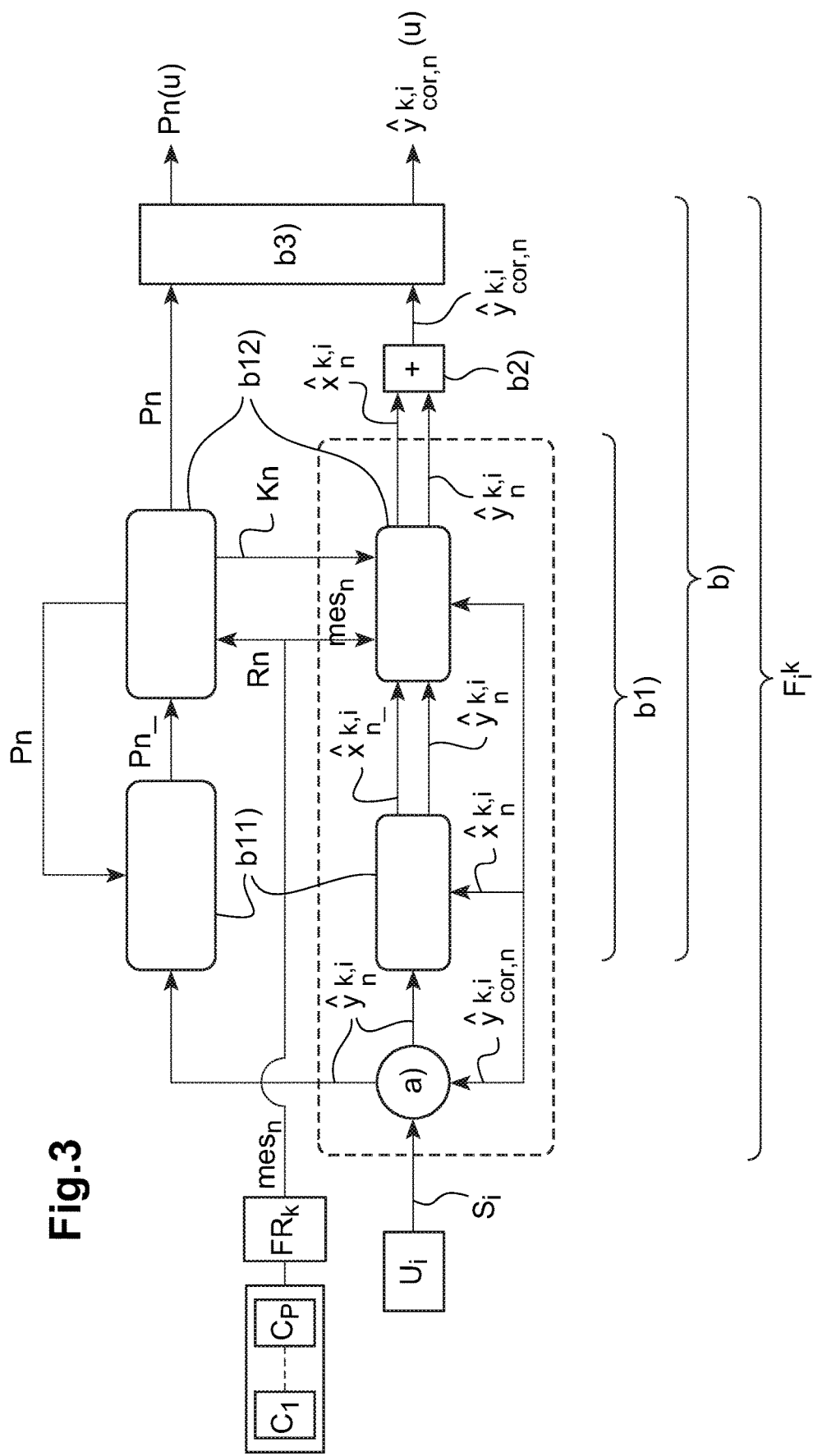
Figure 4:
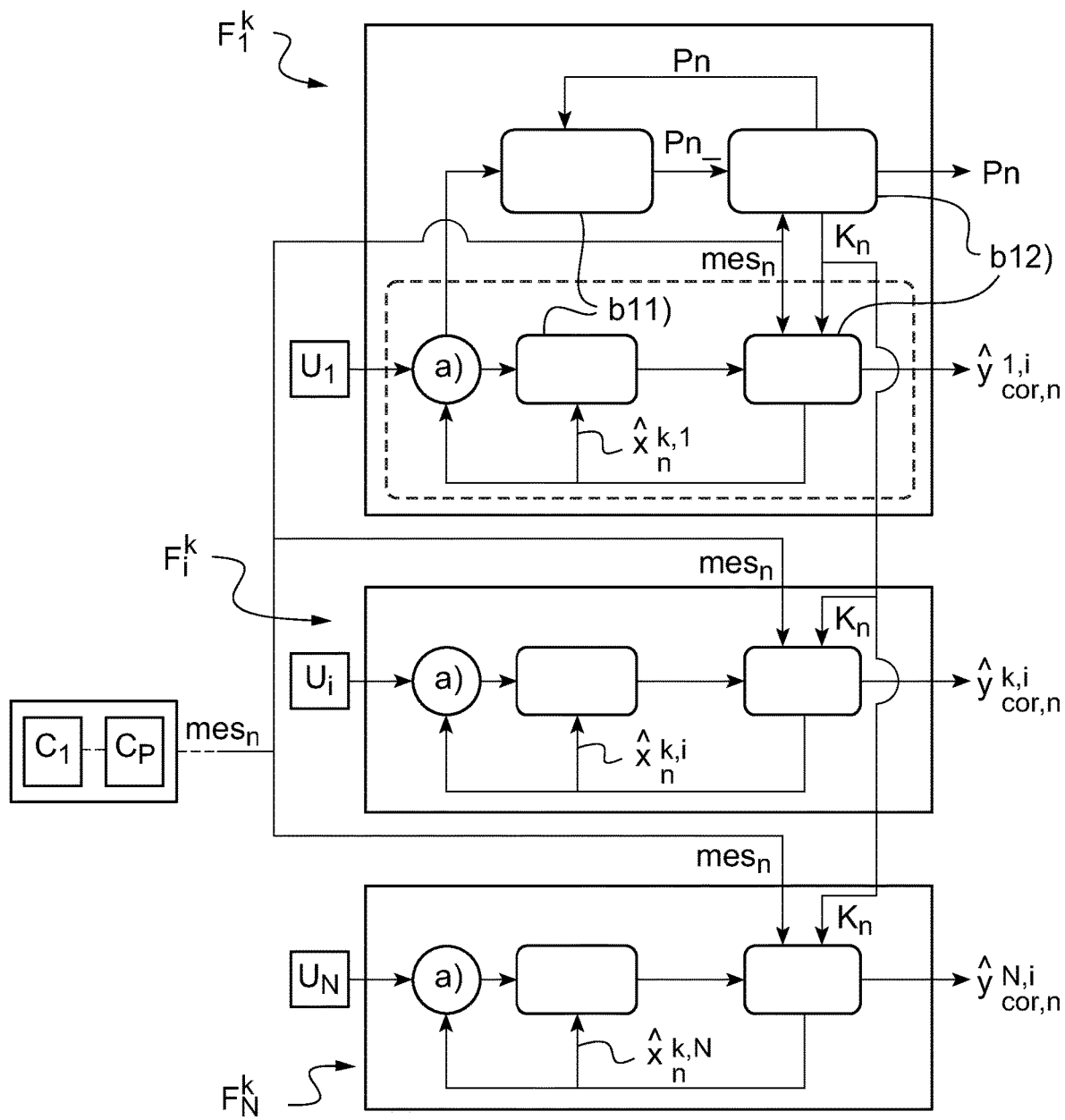
Figure 5:
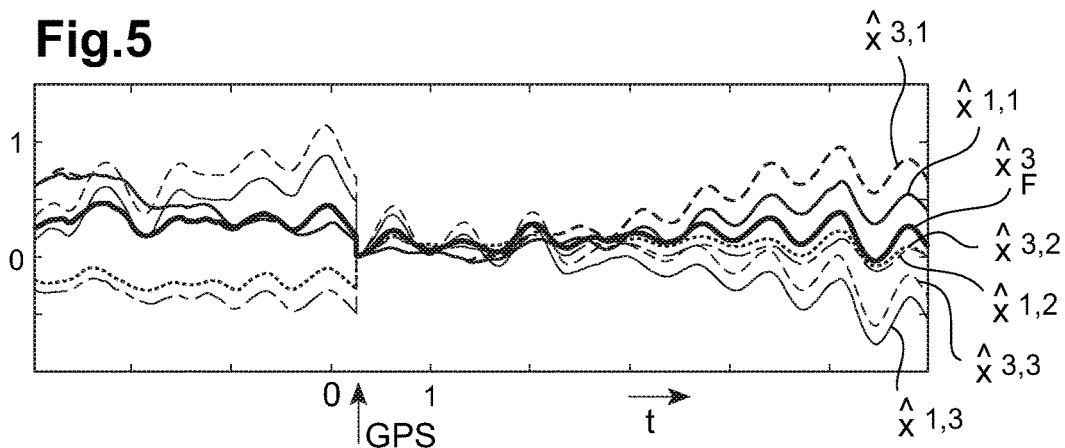
Figure 6:
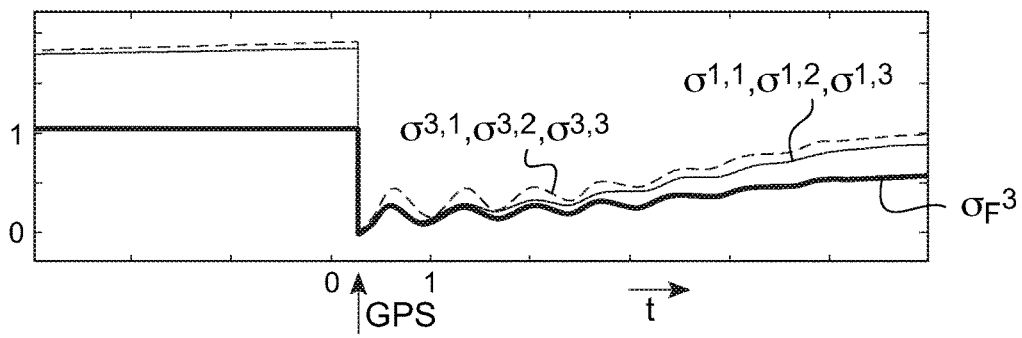
Figure 7:
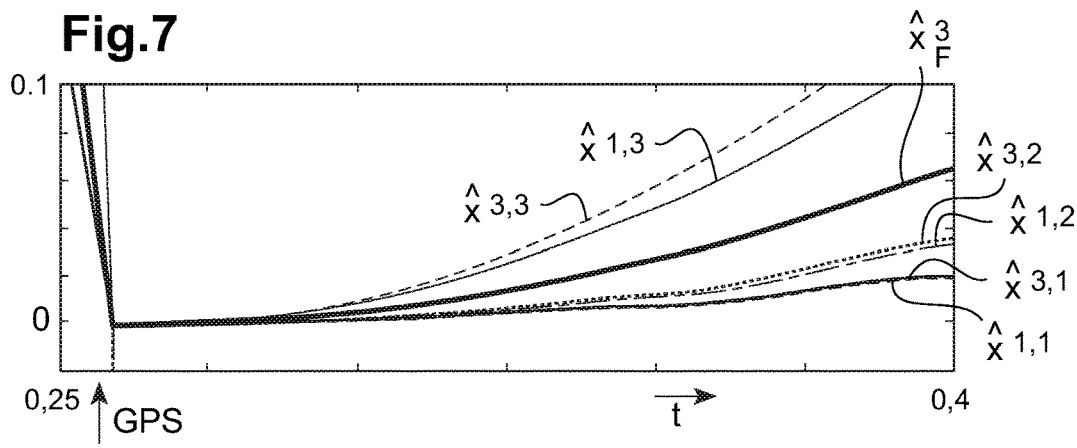
Figure 8:
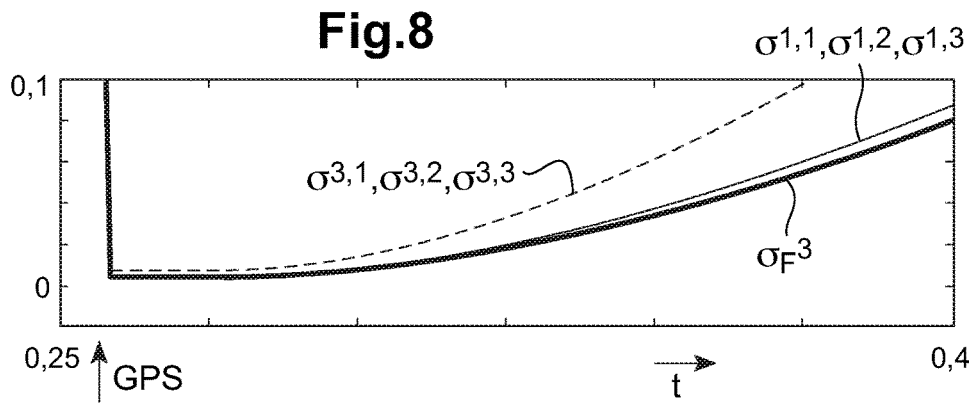

In the appended drawings:

FIG. 1 schematically shows a ship, provided with a positioning system according to the invention, FIG. 2 schematically shows the principal elements of the positioning system of FIG. 1, FIG. 3 schematically shows, as a block diagram, operations performed by a navigation filter of the positioning system of FIG. 1, FIG. 4 schematically shows the arrangement of different navigation filters of the positioning system of FIG. 1 relative to each other, FIG. 5 schematically shows the evolution over time of different estimates of a positioning parameter of the positioning system of FIG. 1, determined by means of the navigation filters of this system, FIG. 6 schematically shows the evolution over time of the standard deviations of the different estimates of the positioning parameter shown in FIG. 5, FIGS. 7 and 8 are enlarged detail views of FIGS. 5 and 6, FIG. 9 schematically shows the evolution over time of standard deviations determined by an error detection module of the positioning system, FIG. 10 is an enlarged detail view of a part of FIG. 9.

FIG. 1 schematically shows a ship 2 provided with a positioning system 1, in accordance with the teaching of the invention.

This system 1, whose main elements are shown in FIG. 2, may also advantageously equip a submarine, a terrestrial vehicle such as a motor vehicle, an aircraft, or also a device intended to be used in the outer space.

The positioning system 1 comprises an inertial platform, which itself comprises several inertial measurement units $U_1, U_2, \ldots U_i, \ldots, U_N$, which are N in number.

It also comprises:

at least one common sensor $C1, \ldots, Cp$, such as a GPS positioning system, each of these sensors being configured to provide a measurement of at least one positioning parameter of system 1, and an electronic processing unit 10.

The processing unit 10 comprises several navigation filters $F_1^1, \ldots, F_i^k, \ldots, F_N^N$, respectively associated with the different inertial measurement units $U_1, \ldots, U_i, \ldots, U_N$ (FIG. 2).

Each navigation filter $F_i^k$ has a structure close to that of a Kalman filter. This filter $F_i^k$ determines a first estimate $\hat{y}^{k,i}$ of a state vector y of system 1 (some components of this state vector are positioning parameters of the system), on the basis of the signals provided by the inertial measurement unit $U_i$ with which this filter is associated. The navigation filer $F_i^k$ then adjusts this first estimate, on the basis of the measurements of the positioning parameters of the system provided by the common sensors $C1, \ldots, Cp$.

A same measurement of one of the positioning parameters of the system, provided by one of the common sensors, is hence used by several individual navigation filters (this measurement is in a way shared between these navigation filters). That is why these sensors are called common sensors. On the contrary, the signals provided by one of the inertial measurement units are specifically addressed to one of the individual navigation filters (or at most to a subgroup of individual navigation filters).

The different components of system 1, and the overall structure of the processing unit 10 will now be described in more detail.

Inertial Measurement Units

The inertial measurement units $U_1, U_2, \ldots U_i, \ldots, U_N$ are rigidly connected to each other. Herein, they are further rigidly connected to the structure of the ship 2 (for example to the ship frame).

Each inertial measurement unit $U_i$ comprises three accelerometers and three gyrometers (or, in other words, a three-axis accelerometer and a tree-axis gyrometer).

Each accelerometer provides an acceleration signal representative of the acceleration undergone by the inertial measurement unit equipped with it, along a given axis (attached to this inertial measurement unit).

Each gyrometer provides an angular speed signal representative of an angular speed of rotation of the measurement unit equipped with it, about a given axis (attached to this inertial measurement unit).

These acceleration and angular speed signals are inertial signals, giving information about the dynamics of this inertial measurement unit $U_i$.

The acceleration and angular speed signals provided by the accelerometers and gyrometers equipping any one of the inertial measurement units $U_1, U_2, \ldots U_i, \ldots, U_N$ make it possible to fully determine the three components of the acceleration vector of this inertial measurement unit, as well as the three components of the angular speed vector of this measurement unit.

Each acceleration signal and each angular speed signal:
  has a bias (i.e. a systematic error, due for example to a slight calibration error; in practice, this bias may be very low), and
  is affected with a white Gaussian stochastic noise (random error).

The performances of the different inertial measurement units $U_1, U_2, \ldots U_i, \ldots, U_N$, in terms of signal-to-noise ratio, are close to each other.

More precisely, a relative deviation between the respective signal-to-noise ratios of two of the acceleration signals, respectively provided by any two of said measurement units $U_1, U_2, \ldots U_i, \ldots, U_N$, is herein lower than 30%, or even lower than 3%.

The biases respectively shown by these two acceleration signals have then variances that differ from each other by only 30% at most, or even by 3% at most. Likewise, the white noises that respectively affect these two acceleration signals have variances that differ from each other by only 30% at most, or even by 3% at most.

Likewise, a relative deviation between the respective signal-to-noise ratios of two of the angular speed signals, respectively provided by any two of said measurement units $U_1, U_2, \ldots U_i, \ldots, U_N$, is herein lower than 30%, of even lower than 3%. Hence, the biases respectively shown by these two angular speed signals have variances that differ from each other by only 30% at most, or even by 3% at most, and the white noises that respectively affect these two signals have variances that differ from each other by only 30% at most, or even by 3% at most.

In this case, in the embodiment described herein:
  the variances of the biases shown by the acceleration signals respectively provided by the measurement units $U_1, U_2, \ldots U_i, \ldots, U_N$, are equal two by two; each of these variances is noted $p^o_{a\_UMI}$ hereinafter;
  the variances of the white noises shown by these acceleration signals are also equal two by two; each of these variances is noted $q_{a\_UMI}$;
  the variances of the biases shown by the angular speed signals provided by the inertial measurement units are equal two by two; each of these variances is noted $p^o_{g\_UMI}$ hereinafter; and
  the variances of the white noises shown by these angular speed signals are also equal two by two; each of these variances is noted $q_{g\_UMI}$ hereinafter.

The following vales of these variances are given by way of example:

$$p^o_{a\_UMI} = (30\ \mu g)^2$$

(i.e. squared 30 micro-g, where g is the mean value of the acceleration of gravity, equal to 9.8 meters per square second, 1 micro-g being equal to $10^{-6} \cdot g$)

$$q_{a\_UMI} = (5\ \mu g/\sqrt{Hz})^2$$

(i.e. 5 micro g per square root Hertz, the whole being squared)

$$p^o_{g\_UMI} = (5\ mdeg/h)^2$$

(i.e. 5 millidegrees per hour, the whole being squared), and $$q_{g\_UMI} = (5\ mdeg/\sqrt{h})^2$$

(i.e. 5 millidegrees per square root hour, the whole being squared).

Common Sensors

In the embodiment described hereinabove, at least one of the common sensors comprises a radio positioning system, herein of the GPS type. This GPS positioning system provides a set of measurements respectively representative of:
  a longitude,
  a latitude, and
  an altitude
locating the positioning system 1 in the terrestrial reference system.

As a complement, the GPS positioning system could also provide measurements representative of a heading angle, a roll angle and/or a pitch angle of the positioning system 1, with respect to the terrestrial reference system.

The positioning system 1 may also comprise other common sensors, made for example by means of:
  a loch, for example an electromagnetic loch,
  an altimeter or a depth gauge,
  an acoustic positioning system,
  a set of magnetic field sensors having a compass function, or an odometer.

For each of these sensors, the measured positioning parameters may comprise one or several of the following magnitudes:
  a longitude, a latitude, or an altitude locating the positioning system,
  a component of the speed of the positioning system with respect to the terrestrial reference system,
  a heading angle, a roll angle or a pitch angle of the positioning system, with respect to the terrestrial reference system.

The measurement provided by any one of the common sensors may also be representative of a deviation between, on the one hand, one of the magnitudes mentioned hereinabove, and, on the other hand, a value of this magnitude otherwise evaluated (for example evaluated by integration of one of the inertial signals).

As will appear hereinafter, the measurement provided by one of the common sensors may also be representative, indirectly, of one of the following magnitudes:
  a bias of one of the accelerometers or of one of the gyrometers,
  a gravity anomaly,
  a speed of a sea current,
  a calibration parameter of said common sensor.

The measurements provided by the common sensors are each affected by a measurement noise.

The measurement noises respectively affect the longitude, latitude and altitude measurements provided by the GPS positioning system have herein variances that are close to each other, or even equal two by two. Each of these measurement noises comprises a white Gaussian noise component, and a temporally correlated noise component. The variance of the white measurement noise is noted $r_{\_GPS}$, and that of the temporally correlated noise is noted $q_{\_GPS}$.

The following values of these variances are given by way of example:

$$r_{\_GPS} = (10 \text{ meters})^2$$

$$q_{\_GPS} = (5 \text{ meters})^2 \cdot 2\Delta t / \tau_{GPS}$$

where $\Delta t$ is a time step and where $\tau_{GPS}$ is a correlation time of the temporally correlated measurement noise.

It is noted that a temporally correlated noise is a noise that affects a variable X as follows: under the influence of this correlated noise, the variable X follows the following equation:

$$\dot{X} = -\frac{1}{\tau} X + \sigma \sqrt{\frac{2}{\tau}} b,$$

where $\tau$ is the correlation time of this noise, $\sigma$ is a standard deviation, and b is a white Gaussian noise of unit variance.

Overall Structure of the Electronic Processing Unit

The electronic processing unit 10 comprises at least a processor, a memory, inputs for acquiring the signals provided by the inertial measurement units, and inputs for acquiring the measurements provided by the common sensors.

As can be seen in FIG. 2, the electronic processing unit 10 10 comprises several modules, including the navigation filters $F_1^1, \ldots, F_i^k, \ldots, F_N^N$ mentioned hereinabove, and fusion modules $F_{us}^1, \ldots, F_{us}^k, \ldots, F_{us}^N$.

Each module of the processing unit 10 may be made by means of a set of dedicated electronic components and/or by means of a set of instructions stored in the memory (or in one of the memories) of the processing unit 10. The processing unit 10 may be made as an electronic unit which is distinct from the inertial measurement units and external to these latter. It may also be made as several electronic circuits, or comprise several groups of instructions, certain of which may be integrated to the inertial measurement units themselves.

"k-Fusionable" Naviqation Filters

Each navigation filter $F_i^k$:
receives as an input the acceleration and angular speed signals, noted $S_i$, provided by the inertial measurement unit $U_i$ to which it is associated, and
determines, in particular from these signals, a corrected estimate $\hat{y}_{cor}^{k,i}$ of the state vector y of the system.

As will be explained in detail hereinafter (with reference to FIG. 3), the state vector y comprises in particular positioning parameters of system 1 (position, speed and attitude of the system with respect to the terrestrial reference system).

The corrected estimates $\hat{y}_{cor}^{k,i}, \ldots, \hat{y}_{cor}^{N,N}$ determined by the navigation filters $F_i^k, \ldots, F_N^N$ (k≠1) are intended to be fused, i.e. averaged together, by means of the fusion filters $F_{us}^k, \ldots, F_{us}^N$, to obtain different mean estimates $\hat{y}_F^{k,l}$ of the state vector y of the system.

The joint data of one of these mean estimates $\hat{y}_F^{k,l}$ and of a covariance matrix of the errors affecting this estimate is sometimes called "navigation solution" in the specialized literature.

Each mean estimate $\hat{y}_F^{k,l}$ comprises several components, certain of which are mean estimates of the positioning parameters of the system. Other components of the mean estimate $\hat{y}_F^{k,l}$ correspond to estimates of the environmental parameters (variation of the value of gravity, sea current), or to estimates of operating parameters of the common sensors or of the inertial measurement units (biases of the inertial measurement units, for example).

However, some of the navigation filters, noted $F_1^1, \ldots, F_i^1, \ldots, F_N^1$, are made by means of individual conventional Kalman filters that provide outputs that are not intended to be fused together. Each of these filters $F_1^1, \ldots, F_i^1, \ldots, F_N^1$, is configured to provide a corrected estimate $\hat{y}_{cor}^{1,i}$, which, in itself, in the absence of later fusion, corresponds to the better estimate of the state vector y that can be obtained on the basis of the signals $S_i$ provided by the inertial measurement unit $U_i$ and of the measurement provided by the common sensors ($\hat{y}_{cor}^{1,i}$ is an optimum estimate in the absence of later fusion), or that is at least close to such an optimum estimate of the state vector y. For that reason, the filters $F_1^1, \ldots, F_i^1, \ldots, F_N^1$ are called "1-fusionable" filters hereinafter.

The other navigation filters $F_i^k, \ldots, F_N^N$ (k≠1) are specifically configured so that the corrected estimates $\hat{y}_{cor}^{k,i}$ they provide are well adapted to be fused together.

More precisely, each navigation filter $F_i^k$ is configured so that the corrected estimate $\hat{y}_{cor}^{k,i}$ of the state vector y it provides leads, once fused with a determined number k−1 of such estimates (chosen among the corrected estimates $\hat{y}_{cor}^{k,1}, \ldots, \hat{y}_{cor}^{k,i}, \ldots, \hat{y}_{cor}^{k,N}$), to a mean estimate $\hat{y}_F^{k,l}$ of the state vector y that is more accurate than what would be obtained by fusing a number k of corrected estimates provided by individual conventional Kalman filters, such as the navigation filters $F_1^1, \ldots, F_i^1, \ldots, F_N^1$ described hereinabove.

Preferably, the navigation filter $F_i^k$ is even configured so that the mean estimate $\hat{y}_F^{k,l}$ of the state vector y of the system, obtained by fusing the corrected estimate $\hat{y}_{cor}^{k,i}$ with a number k−1 of such estimates, i.e. an optimum estimate of the state vector y of the system. The configuration of the navigation filter $F_i^k$, which allows the mean estimate $\hat{y}_F^{k,l}$ (fused) to be optimum, is described in more detail hereinafter with reference to FIG. 3. It is based on a variance augmentation technique.

Because the filters $F_1^k, \ldots, F_i^k, \ldots, F_N^k$ hence provides corrected estimates $\hat{y}_{cor}^{k,1}, \ldots, \hat{y}_{cor}^{k,i}, \ldots, \hat{y}_{cor}^{k,N}$ intended to be fused together by groups of k estimates, they are called hereinafter "k-fusionable" filters.

Fusion Module

The fusion module $F_{us}^k$ is associated with all the $F^k$ "k-fusionable" navigation filters $F_1^k, \ldots, F_i^k, \ldots, F_N^k$ (FIG. 2).

The fusion module $F_{us}^k$ receives as an input the N corrected estimates $\hat{y}_{cor}^{k,1}, \ldots, \hat{y}_{cor}^{k,i}, \ldots, \hat{y}_{cor}^{k,N}$ provided by these navigation filters, and provides, as an output, one or several mean estimates $\hat{y}_F^{k,l}$ of the state vector y.

Each mean estimate $\hat{y}_F^{k,l}$ is equal to the arithmetic mean, weighted or not, of a set of k corrected estimates, chosen among the N "k-fusionable" corrected estimates $\hat{y}_{cor}^{k,1}, \ldots, \hat{y}_{cor}^{k,i}, \ldots, \hat{y}_{cor}^{k,N}$.

Several combinations of k estimates chosen among N estimates are conceivable (except for k=N). Indeed, the number of distinct sets, which each comprise k corrected estimates chosen among the N corrected estimates $\hat{y}_{cor}^{k,1}, \ldots, \hat{y}_{cor}^{k,i}, \ldots, \hat{y}_{cor}^{k,N}$ is equal to $$C_N^k = \frac{N!}{k!(N-k)!}$$

(where the quantity N! is the factorial of N).

In the embodiment described herein, the fusion module $F_{us}^k$ is configured to determine a mean estimate of the state vector y, for each of these sets of k corrected estimates.

The number of mean estimates $\hat{y}_F^{k,l}$ (with l comprised between 1 and $C_N^k$), determined by the fusion module $F_{us}^k$, is hence equal to $C_N^k$.

For example, if the inertial measurement units are 3 in number (N=3), the fusion module $F_{us}^2$, which is dedicated to the "2-fusionable" navigation filters, determines $C_3^2=3$ distinct mean estimates of the state vector y, by fusing respectively:
- the corrected estimate $\hat{y}_{cor}^{2,1}$ ("2-fusionable" estimate provided by the inertial measurement unit $U_1$) with the corrected estimate $\hat{y}_{cor}^{2,2}$ ("2-fusionable" estimate provided by the inertial measurement unit $U_2$),
- the corrected estimate $\hat{y}_{cor}^{2,1}$ with the corrected estimate $\hat{y}_{cor}^{2,3}$ ("2-fusionable" estimate provided by the inertial measurement unit $U_3$), and
- the corrected estimate $\hat{y}_{cor}^{2,2}$ with the corrected estimate $\hat{y}_{cor}^{2,3}$.

Hence, each fusion module determines several distinct mean estimates of the state vector y, except from the fusion module $F_{us}^N$ that determines a single mean estimate, equal to the mean of the N "N-fusionable" corrected estimates.

It is moreover reminded that each corrected estimate $\hat{y}_{cor}^{k,i}$ comes from the signals produced by the inertial measurement unit $U_i$ with which is associated the navigation filter $F_i^k$.

Each mean estimate $\hat{y}_F^{k,l}$ determined by the fusion module $F_{us}^k$ is hence obtained from the signals produced by a given subset of k inertial measurement units, chosen among the N inertial measurement units $U_1, \ldots, U_i, \ldots, U_N$.

Multi-Estimate by the Processing Unit

As just seen, the processing unit 10 is configured to determine several distinct mean estimates $\hat{y}_F^{k,l}$ of the state vector y, obtained from the signals respectively provided by different subgroups of inertial measurement units (chosen among the N inertial measurement units of the system 1).

Having these different mean estimates $\hat{y}_F^{k,l}$ advantageously allows detecting a possible dysfunction of one of the inertial measurement units.

Moreover, this makes the system particularly robust against a potential failure of one (or several) of the inertial measurement units. If such a failure occurs, the mean estimates $\hat{y}_F^{k,l}$ obtained from the signals provided by the failing measurement unit are discarded, whereas the other mean estimates $\hat{y}_F^{k,l}$ are still usable and are not degraded by the failure in question.

The number of distinct subgroups of inertial measurement units, chosen among the N inertial measurement units of system 1, is equal to $\Sigma_{k=1}^{K=N} C_N^k = 2^N - 1$.

In the embodiment described hereinabove, the processing unit 10 determines a mean estimate ($\hat{y}_F^{k,l}$) of the state vector y for each of these subgroups. The processing unit hence determines $2^N-1$ distinct mean estimates $\hat{y}_F^{k,l}$ of the state vector of the system. These $2^N-1$ mean estimates are obtained by means of only $N^2$ individual navigation filters, that operate independently from each other.

By way of comparison, in a system in which the signals provided by the inertial measurement units are first fused with each other, and where the result of each of these fusion operations is then filtered by a navigation filter, $2^N-1$ distinct navigation filters are required (instead of $N^2$) to obtain $2^N-1$ distinct mean estimates of the state vector of the system.

Comparably, in a system using individual (local) navigation filters with reinjection of one of the mean estimates as an input of the filters, $2^N-1$ distinct navigation filters would be required to obtain $2^N-1$ distinct mean estimates of the state vector of the system.

The present solution, in which the signals provided by the different inertial measurement units are locally (i.e. individually) filtered and without reinjection, hence requires far less calculation resources than the other solutions mentioned hereinabove (at least when the number N of inertial measurement units is high, higher than or equal to 5, because $N^2$ is then lower than $2^N-1$). Moreover, this architecture permits an effective detection of a potential dysfunction of one of the inertial measurement units (as explained hereinafter during the presentation of the error detection module).

Structure of the Navigation Filter $F_i^k$

The structure of each navigation filters $F_1^1, \ldots, F_i^k, \ldots, F_N^N$ will now be described in more detail, with reference to FIG. 3.

The magnitudes estimated thanks to the navigation filter $F_i^k$ will be first described. The operations executed by the filter, and the structure of the noises taken into account by the latter will then be described.

In the embodiment described herein, the state vector y, whose corrected estimate $\hat{y}_{cor}^{k,i}$ is determined by the navigation filter $F_i^k$, comprises:
- the positioning parameters of the system (position, speed, attitude), for example gathered as a positioning vector $y_P$,
- parameters external to the inertial measurement unit $U_i$, noted $y_E$, and
- operating parameters of the inertial measurement unit $U_i$, noted $y_{Ui}$.

The positioning vector $y_P$ herein comprises the 9 following components, which locate the positioning system in the terrestrial reference system:
- a longitude,
- a latitude,
- an altitude,
- a component of the system speed along the South-North local axis,
- a component of this speed along the East-West local axis,
- a component of this speed along the local vertical axis (i.e. along the vertical axis of the place where the positioning system is located),
- a heading angle,
- a roll angle, and
- a pitch angle.

The external parameters $y_E$ herein comprise:
- one or several parameters relating to the environment of the inertial measurement unit $U_i$, and
- one or several parameters relating to the operation of the common sensor(s) C1, ... $C_P$.

More precisely, the external parameters $y_E$ herein comprise the 4 following scalar parameters:
- a gravity anomaly noise, spatially correlated, linked to the ignorance of the exact value of the gravity at the point where the system is located, and
- the 3 temporally correlated noise components that affect the longitude, latitude and altitude measurements provided by the GPS positioning system (these components have been described hereinabove).

It is to be noted that a spatially correlated noise is a noise that affects a variable X as follows: under the influence of this correlated noise, the variable X follows the following equation:

$$\dot{X} = -\frac{v}{L}X + \sigma\sqrt{\frac{2v}{L}}b,$$

where L is the correlation length of this noise, v a displacement speed, a σ standard deviation, and b a white Gaussian noise of unit variance.

As for the operating parameters $y_{Ui}$ of the inertial measurement unit $U_i$, they herein comprise:
- 3 scalar components respectively representative of the biases of the 3 accelerometers of the inertial measurement unit $U_i$, et
- 3 scalar components respectively representative of the biases of the 3 gyrometers of the inertial measurement unit $U_i$.

The state vector y considered herein hence comprises 19 scalar components.

Each navigation filter $F_i^k$ is configured to:
a) determine a first estimate $\hat{y}^{k,i}$ of the state vector y, by time integration of the acceleration and angular speed signals $S_1$ provided by the inertial measurement unit $U_i$, then to
b) determine the corrected estimate $\hat{y}_{cor}^{k,i}$ of the state vector y of the system, by adjusting the first estimate $\hat{y}^{k,i}$ of the state vector y on the basis of the measurements $mes_n$ provided by the common sensors C1, ... Cp,
the filter executing steps a) and b) several times successively.

Steps a) and b) are executed at each calculation step.

At the calculation step number n, at step a), the navigation filter determines the first estimate $\hat{y}_n^{k,i}$ of the state vector y, as a function of the acceleration and angular speed signals $S_i$ provided by the inertial measurement unit $U_i$, and as a function of the first estimate $\hat{y}_{n-1}^{k,i}$ of the state vector y at the previous calculation step (n−1) and/or as a function of the corrected estimate $\hat{y}_{cor,n-1}^{k,i}$ of the state vector y at the previous calculation step.

In the embodiment described herein, step b) comprises the following steps:
b1) determining an estimated error $\hat{x}_{k,i}$, representative of a deviation between the state vector y and the first estimate $\hat{y}^{k,i}$ of this state vector, the estimated error being determined as a function in particular of the measurements provided by the common sensor C1, . . . , Cp, then
b2) determining the corrected estimate $\hat{y}_{cor}^{k,i}$ of the state vector y by summing the first estimate $\hat{y}^{k,i}$ of this state vector y with the estimated error $\hat{x}^{k,i}$: $\hat{y}_{cor}^{k,i} = \hat{x}^{k,i} + \hat{y}^{k,i}$.

The estimated error $\hat{x}^{k,i}$ is an estimate of the deviation x between the state vector y and the first estimate $\hat{y}^{k,i}$ of this vector: $x = y - \hat{y}^{k,i}$. Hereinafter, the deviation x is called error vector.

The estimated error $\hat{x}^{k,i}$ is determined, at step b1), by an iterative correction process described hereinafter. The navigation filter $F_i^k$ is hence configured to estimate, iteratively, the error shown by the position signal ($\hat{y}^{k,i}$) deduced from the acceleration and angular speed signals $S_i$.

As a variant, the navigation filter could be made by means of a (modified) Kalman filter that, instead of determining the intermediate magnitude constituted by the estimated error $\hat{x}^{k,i}$, would estimate directly the state vector y, based on the acceleration and angular speed signals $S_1$ and on the measurements provided by the common sensors.

During the successive executions of step b1), the navigation filter $F_i^k$ determines step by step, iteratively, the estimated error $\hat{x}_n^{k,i}$ at the calculation step n, as well as an estimate $P_n^{k,i}$ of the covariance matrix of the error vector x.

This step by step determination is made starting from an initial estimate of the error vector, noted $\hat{x}_0^{k,i}$, and for an initial estimate of the covariance matrix of the error vector, noted $P_0^{k,i}$ (this variance being previously augmented, as explained hereinafter).

This step by step determination is made by executing, at each repetition of step b1):
a step b11) of propagating the estimated error (sometimes called prediction step), then
a step b12) of updating this error (sometimes called adjustment step), during which the estimated error is adjusted on the basis of the measurements provided by the common sensors C1, . . . , Cp.

The navigation filter $F_i^k$ executes the propagation and updating steps at each calculation step.

The time evolution of the error vector x, due in particular to the displacement of the system, is taken into account during the propagation step. This time evolution is governed by the following evolution equation (which models in particular the displacement dynamics of system 1):

$$x_n^i = F_n x_{n-1}^i + v_n^s + v_n^e$$

where the index n is the number of the considered calculation step, where $F_n$ is obtained by linearization of the non-linear evolution equation of $y^i$ in the vicinity of the state vector $y_n^i$ and where the processes $v^S = \{v_n^s\}_{n \in \mathbb{N}}$ and $v^e = \{v_n^e\}_{n \in \mathbb{N}}$ are (vectorial) white Gaussian noises, respectively called specific propagation and external noises. The process $v^s$ represents the noise affecting the signal provided by the inertial measurement unit associated with the considered navigation filter, specific to this inertial measurement unit. The process $v^e$ represents the noise external to said inertial measurement unit, and which is independent of the considered inertial measurement unit.

During the execution number n of the propagation step (n higher than or equal to 1), the navigation filter $F_i^k$ performs the following calculation operations:

$$x_{n\_}^{k,i} = F_n \hat{x}_{n-1}^{k,i}, et$$

$$P_{n\_}^{k,i} = F_n P_{n-1}^{k,i} F_n^T + Q_n^s + Q_{n,aug}^e,$$

where $Q_n^s$ is the covariance matrix of the specific propagation noise $v_n^s$ and $Q_{n,aug}^e$ is an augmented covariance matrix.

The augmented covariance matrix $Q_{n,aug}^e$ is determined as a function of the covariance matrix $Q_n^e$ of the external propagation noise $v_n^e$. In a particularly remarkable way, the augmented covariance matrix $Q_{n,aug}^e$ is higher than the covariance matrix $Q_n^e$ of the external propagation noises ($\forall x \in \mathbb{R}^d, x^T Q_{n,aug}^e x > x^T Q_n^e x$). Herein, the augmented covariance matrix $Q_{n,aug}^e$ is proportional to the covariance matrix $Q_n^e$. More precisely, the covariance matrix $Q_{n,aug}^e$ is herein equal to the covariance matrix $Q_n^e$ of the external propagation noise, multiplied by the number k: $Q_{n,aug}^e = k \, Q_n^e$.

The taking into account of the measurements provided by the common sensors, during the updating step, will now be described.

As already indicated, the common sensors provide measurements representative of one or several components of the state vector y, affected by a measurement noise. The set of measurements provided by the common sensors, noted $mes_n$, is connected to the state vector y by a measurement matrix $H_n$, as:

$$mes_n = H_n y_n + w_n$$

where le process $w = \{w_n\}_{n \in \mathbb{N}}$ is a (vectorial) white Gaussian noise, whose different components comprise the measurement noises mentioned hereinabove. As for the measurement matrix $H_n$, its components correspond in a way to the respective measurement gains of the common sensors.

Herein, all the measurements provided by the common sensors, mesa, are taken into account by the navigation filter $F_i^k$ in a modified form $z_n$, so as to be representative of the error vector x, instead of the state vector y. This set of modified measurements $z_n$ is deduced from the measurements $mes_n$ in accordance with the following formula:

$$z_n = mes_n - H_n \hat{y}_n^{k,i}.$$

The set of modified measurements $z_n$ is hence also linked to the error vector x by the measurement matrix $H_n$ mentioned hereinabove, by the following equation:

$$z_n = H_n x_n^i + w_n.$$

During the execution number n of the updating step, the navigation filter performs the following calculation operations:

$$\hat{x}_n^{k,i} = \hat{x}_{n\_}^{k,i} + K_n(z_n - H_n \hat{x}_{n\_}^{k,i}), \text{ and}$$

$$P_n^{k,i} = (Id - K_n H_n) P_{n\_}^{k,i}, \text{ where } Id \text{ is an identity matrix.}$$

It is noted that the corrective term $K_n(z_n - H_n \hat{x}_{n\_}^{k,i})$ could also be expressed as: $K_n(mes_n - H_n[\hat{y}_n^{k,i} + \hat{x}_{n\_}^{k,i}])$.

The correction gain $K_n$, which allows adjusting the estimate $\hat{x}_{n\_}^{k,i}$ as a function of the measurements $mes_n$, is sometimes called Kalman gain. Preferably, it is determined so as to have, with an optimum gain $K_{n,opt}$, a relative deviation lower than 30%, or even lower than 3%. In the embodiment described herein, the correction gain $K_n$ is even equal to the optimum gain $K_{n,opt}$.

Said optimum gain $K_{n,opt}$ is given by the following formulas (at each execution of the updating step, the correction gain is hence determined in accordance with these formula):

$$K_{n,opt} = P_{n\_}^{k,i} H_n^T S_n^{-1}, \text{ and}$$

$$S_n = H_n P_{n\_}^{k,i} H_n^T + V_{aug}$$

where $H_n^T$ is the transposed matrix of the measurement matrix $H_n$, $S_n^{-1}$ is the inverse of the innovation covariance matrix $S_n$, and $V_{aug}$ is an augmented covariance matrix.

Herein, the covariance matrix $V_{aug}$ is equal to the covariance matrix $R_n$ of the measurement noises, multiplied by the number k: $V_{aug} = k \cdot R_n$.

With respect to a conventional Kalman filter, the estimated error $\hat{x}_n^{k,i}$ and its covariance matrix $P_n^{k,i}$ are hence determined based in a way on an "augmented" variance of the external propagation noises and of the measurement noises, instead of being based directly on the respective variances $(Q_n^e)$ and $(R_n)$ of these noises (in a conventional Kalman filter, the estimated error $\hat{x}_n^{k,i}$ would be determined by means of the operations described hereinabove, but by replacing the augmented covariance matrices $Q_{n,aug}^e$ and $V_{aug}$ by the covariance matrices $Q_n^e$ and $R_n$, respectively, between other modifications).

This is in particular thanks to this variance augmentation technique that the corrected estimate $\hat{y}_{cor}^{k,i}$ determined by the navigation filter $F_i^k$, is well adapted to be fused with a number k−1 of other "k-fusionable" corrected estimates.

Hence, using the augmented covariance matrices $Q_{n,aug}^e$ and $V_{aug}$, instead of the covariance matrices $Q_n^e$ of the external propagation noises and $R_n$ of the measurement noises, advantageously allows the mean estimate $\hat{y}_F^{k,l}$ of the state vector y of the system, obtained by fusion of k corrected estimates chosen among the corrected estimates $\hat{y}_{cor}^{k,1}, \ldots, \hat{y}_{cor}^{k,i}, \ldots, \hat{y}_{cor}^{k,N}$, to be an optimum estimate of the state vector y.

It is noted that the mean estimate $\hat{y}_F^{k,l}$ of the state vector y hence obtained is optimum, even when each individual navigation filter $F_i^k$ executes steps a) and b), during which the corrected estimate $\hat{y}_{cor}^{k,i}$ is determined, without taking into account this mean estimate $\hat{y}_F^{k,l}$ obtained after fusion.

In this positioning system 1, the mean estimates of the positioning parameters of the system are hence not reinjected as inputs of the individual navigation filters $F_i^k$ (at least not at each calculation step), so that the different navigation filters operate independently of each other.

The fact that the above-mentioned variance augmentation makes the mean estimate $\hat{y}_F^{k,l}$ of the state vector y optimum may be understood as follows.

The k "k-fusionable" navigation filters, whose outputs $\hat{y}_{cor}^{k,i}$ are fused together, operate independently of each other but share between each other common information coming from the environment and from the common sensors. For example, each of these filters undergoes the same gravity anomaly and uses the positioning data provided by the same above-mentioned GPS positioning system. The corrected estimates $\hat{y}_{cor}^{k,i}$ provided by these filters have hence correlations between each other, which would have to be taken into account to optimally combine these estimates between each other. And, herein, it is difficult to evaluate these correlations.

The variance augmentation mentioned hereinabove makes is possible in a way to decorrelate the corrected estimates $\hat{y}_{cor}^{k,i}$ determined by these navigation filters. Indeed, it may be considered that each of these k navigation filters receives only a k-th of the common information mentioned hereinabove (instead of the totality of these common information), and that, in compensation, the corrected estimate $\hat{y}_{cor}^{k,i}$ it provides is formally independent of the other corrected estimates. An optimum estimate of the state vector of the system may then be obtained by calculating directly the mean (possibly weighted) of the k corrected estimates $\hat{y}_{cor}^{k,i}$ provided by these navigation filters (because these estimates are strictly independent of each other). As the quantity of information is equal to the inverse of the covariance, to affect to the navigation filter $F_i^k$ only a k-th of said common information, the covariance matrix $Q_n^e$ of the external noises and the covariance matrix $R_n$ of the measurement noises must be multiplied.

A mathematical justification of the fact that the mean estimate $\hat{y}_F^{k,l}$ of the so-obtained state vector y is optimum is more fully described hereinafter (paragraphs relating to the optimality of the method).

It is however understood right now that it is desirable, for the mean estimate $\hat{y}_F^{k,l}$ of the state vector y to be optimum (or at least close to an optimum solution), to augment not only the variances of the external propagation noises $(Q_n^e)$ and of the measurement noises $(R_n)$, but also the components of the initial covariance matrix $P_0$ of the error vector that are common to all the filters.

More precisely, the covariance matrix of the initial error vector is decomposed into a block diagonal matrix:

$$P_0 = \begin{pmatrix} P_0^e & 0 \\ 0 & P_0^s \end{pmatrix}$$

with:

$P_0^s$ the covariance matrix of the systematic errors (bias) of the inertial measurement unit $U_i$, and $P_0^e$ the covariance matrix of the initial errors of the positioning parameters, of the initial errors relating to the environment model (gravity anomaly), and of the initial errors of the common sensors.

Because the covariance matrix $P_0^e$ is representative of noise or error sources that are common to the different navigation filters, it is provided, in the initial estimate $P_0^{k,i}$ of the covariance matrix of the error vector, to take into account the matrix $P_0^e$ by multiplying it by a coefficient higher than 1, preferentially by multiplying it by the integer k. Hence, the initial estimate $P_0^{k,i}$ of the covariance matrix of the error vector takes herein the following form:

$$P_0^{k,i} = \begin{pmatrix} k \cdot P_0^e & 0 \\ 0 & P_0^s \end{pmatrix}.$$

By way of example, the matrix $P_0^s$ is herein a diagonal matrix 6×6 (this matrix could however be a non-diagonal matrix, according to the type of inertial measurement unit used), whose first three diagonal coefficients are respectively equal to the variances $p°_{a\_UMI}$ of the biases of the accelerometers of the measurement unit (that have been presented hereinabove). The three following diagonal coefficients of this matrix are respectively equal to the variances $p°_{g\_UMI}$ of the biases of the three gyrometers of the measurement unit.

The matrix $P_0^e$ is a diagonal matrix 13×13, of which:
the first three diagonal terms are the variances of the initial errors of the positioning parameters of the inertial measurement unit $U_i$ (latitude, longitude, altitude), for example each equal to (20 meters)$^2$,
the three following diagonal terms are the variances of the initial errors of the speeds of this inertial measurement unit (towards the North, the West and the top, respectively), for example each equal to (0.5 meter per second)$^2$,
the three following diagonal terms are the variances of the initial errors of the cap, roll and pitch angles of this inertial measurement unit, for example each equal to (0.02 degrees)$^2$,
the following diagonal term is the initial variance of the gravity anomaly, herein equal to (10 micro-g)$^2$,
the three following diagonal terms are the initial variances of the temporally correlated noise components affecting the measurements provided by the GPS positioning system, herein equal to (5 meters)$^2$.

The covariance matrix $Q_n^e$ of the external propagation noise $v_n^e$, common to the different inertial measurement units, is herein a diagonal matrix, four diagonal coefficients of which are null. One of these diagonal coefficients is equal to the variance of the gravity anomaly noise (stochastic portion of this noise, which is spatially correlated), noted $q_{\_grav}$. The three other coefficients in question are respectively equal to the variances $q_{\_GPS}$ of the temporally correlated noise components affecting the longitude, latitude and altitude measurements provided by the GPS positioning system (these temporally correlated noise components have been described hereinabove, in the presentation of the common sensors).

The following value of the variance of the gravity anomaly noise $q_{\_grav}$ is given by way of example: $q_{\_grav}= (10 \mu g)^2 \cdot 2v\Delta t/L_{grav}$,
where $\Delta t$ is a time step (between two successive calculation steps), v is the speed of the inertial measurement unit, and $L_{grav}$ is a correlation length of the gravity anomaly noise.

The covariance matrix $Q_n^s$ of the propagation noise $v_n^s$, specific to each inertial measurement unit, is herein a diagonal matrix, six diagonal coefficients of which are null. Three of these diagonal coefficients are respectively equal to the variances $q_{a\_UMI}$ of the white noises shown by the acceleration signals provided by the inertial measurement unit $U_i$. The three other coefficients in question are respectively equal to the variances $q_{g\_UMI}$ of the white noises shown by the angular speed signals provided by this inertial measurement unit (these white noises have been described hereinabove, in the presentation of the inertial measurement units).

Finally, the covariance matrix $R_n$ of the measurement noises is herein diagonal, and has three non-null diagonal coefficients, respectively equal to the variances $r_{\_GPS}$ of the white noise components of the noises affecting the longitude, latitude and altitude measurements, provided by the GPS positioning system.

Optionally, the navigation filter $F_i^k$ is configured to reset the estimated error $\hat{x}^{k,i}$ if the latter exceeds a predetermined threshold (for example, if a norm of the estimated error exceeds a predetermined threshold value). During this resetting, the following substitutions are performed:
the first estimate $\hat{y}_n^{k,i}$ is replaced by the corrected estimate $\hat{y}_{cor,n}^{k,i}$, and
the estimated error $\hat{x}_n^{k,i}$ is reset (i.e. replaced by a null vector).

It will be noted that this resetting is not a reinjection of one of the mean estimates $\hat{y}_F^{k,i}$ (in other words, one of the global solutions) at the input of the navigation filter $F_i^k$ (this resetting remains an operation that involves only the local estimates determined by the navigation filter $F_i^k$).

The fact that the navigation filter $F_i^k$ is configured to first determine the intermediate magnitude constituted by the estimated error $\hat{x}^{k,i}$, then to deduce therefrom the corrected estimate $\hat{y}_{cor}^{k,i}$ of the state vector y of the system, allows, in particular thanks to the above-mentioned resetting, benefitting from propagation and updating equations that, with a very good approximation, are linear (which simplifies in proportion the implementation of the method).

Fusion of the Estimates

Projection in a Same Common Reference System

Each navigation filter $F_i^k$ provides, at each calculation step, the corrected estimate $\hat{y}_{cor,n}^{k,i}$ of the state vector y and the estimate $P_n^{k,i}$ of the covariance matrix of the error vector x (relating to the state vector y).

The corrected estimate $\hat{y}_{cor}^{k,i}$ is determined by the navigation filter $F_i^k$ for a point and a reference direction proper to the inertial measurement unit $U_i$. Indeed, the accelerometer of the measurement unit $U_i$ measure the acceleration of system at a given point of this system, and its gyrometers measure the angular speed of the system about rotation axes proper to the considered inertial measurement unit. Hence, by way of example, the heading angle estimated by the navigation filter $F_i^k$ is herein a heading angle of the inertial measurement unit $U_i$, with respect to the terrestrial reference system.

The inertial measurement units are preferably aligned with respect to each other. But slight misalignments (generally lower than one degree) may however subsist between the different inertial measurement units.

Moreover, the inertial measurement units are located at a reduced distance from each other (a distance separating any two of the inertial measurement units is preferably lower than 3 meters, or even, as herein, lower than 1 meter). Nevertheless, they are not located exactly at the same point. The speeds of these different measurement units (with respect to the terrestrial reference system) may hence be slightly different from each other (when the angular speed of system 1 is not null).

To take into account these slight differences of alignment and position, the different corrected estimates $\hat{y}_{cor}^{k,1}$, ..., $\hat{y}_{cor}^{k,i}$, ..., $\hat{y}_{cor}^{k,N}$ and the estimates $P_n^{k,1}$, ..., $P_n^{k,i}$, ..., $P_n^{k,N}$ of the corresponding covariance matrices, are projected in a same common reference system. Those are the projected estimates $\hat{y}_{cor,n}^{k,1}(u)$, ..., $\hat{y}_{cor,n}^{k,i}(u)$, ..., $\hat{y}_{cor,n}^{k,N}(u)$, and the projected covariance matrices $P_n^{k,1}(u)$, ..., $P_n^{k,i}(u)$, ..., $P_n^{k,N}(u)$, resulting from these projections, that are then averaged between each other to obtain the mean estimates $\hat{y}_F^{k,l}$, and the corresponding covariance matrices $P_F^{k,l}$. The common reference system may be a reference system specified by a user of the positioning system 1.

The projection of the corrected estimate $\hat{y}_{cor,n}^{k,i}$ and of the estimate $P_n^{k,i}$ of the corresponding covariance matrix in the common reference system is a reference system change operation, from a reference system proper to the inertial measurement unit to the above-mentioned common reference system. This projection is performed herein during a sub-step b3) of step b) (FIG. 3), as a function of misalignment angles locating the inertial measurement unit $U_j$ with respect to the common reference system (the values of these misalignment angles may be determined during a previous phase of starting of the positioning system, sometimes called alignment phase). This projection is also made as a function of the position of the reference point proper to this inertial measurement unit (point of measurement of the accelerations, whose position is known by construction), with respect to a common reference point of system 1.

Determination of the Mean Estimates $\hat{y}_F^{k,l}$

As already indicated, the mean estimate $\hat{y}_F^{k,l}$ is determined by fusing k corrected estimates chosen among the N corrected estimates $\hat{y}_{cor}^{k,1}$, ..., $\hat{y}_{cor}^{k,i}$, ..., $\hat{y}_{cor}^{k,N}$. The set of these k corrected estimates is hereinafter noted $E^l$.

The mean estimate $\hat{y}_F^{k,l}$ is determined more accurately by calculating an arithmetic mean of the k projected estimates corresponding to the set $E^l$.

This arithmetic mean is weighted if the estimates $P_n^{k,1}(u)$, ..., $P_n^{k,i}(u)$, ..., $P_n^{k,N}(u)$ of the covariance matrices are in particular different from each other (for example, if they have, relative to each other, deviations higher than a given threshold), or if the navigation filters $F_i^k$ are set differently from each other (i.e. they operate on the basis of distinct covariance matrices, or on the basis of distinct gain matrices K).

Otherwise, this arithmetic means is not weighted.

When this arithmetic mean is calculated in a weighted manner, this is in accordance with the following formula:

$$\hat{y}_{F,n}^{k,l} = P_{F,n}^{k,l} \Sigma_{E^l} (P_n^{k,i}(u))^{-1} \hat{y}_{cor,n}^{k,i}(u) \text{ where}$$
$$P_{F,n}^{k,l} = (\Sigma_{E^l}(P_n^{k,i}(u))^{-1})^{-1},$$

the sum $\Sigma_{E^l}$ involving all the projected estimates $\hat{y}_{cor,n}^{k,i}(u)$ corresponding to the set E.

When this arithmetic mean is calculated in a non-weighted manner, this is in accordance with the following formula:

$$\hat{y}_{F,n}^{k,l} = \frac{1}{k} \sum_{E^l} \hat{y}_{cor,n}^{k,i}(u)$$

the sum $\Sigma_{E^l}$ involving here again all the projected estimates $\hat{y}_{cor,n}^{k,i}(u)$ corresponding to the set E.

The covariance matrix of the errors affecting the mean estimate $\hat{y}_{F,n}^{k,l}$ is then estimated in accordance with the following formula:

$$P_{F,n}^{k,l} = \frac{1}{k^2} \sum_{E^l} P_n^{k,i}(u).$$

The fusion module $F_{us}^k$ outputs both the mean estimate $\hat{y}_{F,n}^{k,l}$ and the estimate $P_{F,n}^{k,l}$ of the corresponding covariance matrix.

Optimized Architecture of the "k-Fusionable" Filters

It is noted that, in the exemplary embodiment described herein, the different inertial measurement units of system 1 have signal-to-noise ratios that are very close, or even equal. Moreover, as these inertial measurement units are close to each other and are rigidly fixed to the same support, their respective dynamics have only slight differences that are averaged over time and counterbalance each other.

In a very good approximation, it may hence be considered herein that the matrices $P_0^{k,i}$, $Q_n^s$, $Q_{n,aug}^e$ and $V_{aug}$ of any two "k-fusionable" navigation filters are identical for these two filters.

Moreover, as regards the estimate $P_n^{k,i}$ of covariance matrix, and the correction gain $K_n$, the same matrix $F_n$ (relating to the dynamics of the inertial measurement units) and the same matrix $H_n$ (relating to the measurement) may be used for the different "k-fusionable" filters.

The correction gain $K_n$ and the estimate $P_n^{k,i}$ of the covariance matrix have then identical values for each of the "k-fusionable" navigation filters $F_i^k$. It is hence provided herein, at each calculation step, to calculate these magnitudes only once for all the "k-fusionable" navigation filters, and to then distribute the result of this calculation to each of these filters (which then operate synchronously), as schematically shown in FIG. 4.

This latter arrangement then advantageously allows reducing the time and/or the calculation resources required for obtaining the corrected estimates $\hat{y}_{cor}^{k,1}$, ..., $\hat{y}_{cor}^{k,i}$, ..., $\hat{y}_{cor}^{k,N}$.

As mentioned hereinabove, the covariance matrices are then identical, $P_n^{k,1} = ... = P_n^{k,i} = ... = P_n^{k,N}$, their common value is noted $P_n^k$. The covariance matrix of the errors affecting the mean estimates $\hat{y}_F^{k,l}$ then does not depend on the set $E^l$ of the averaged estimates. It is determined in accordance with the following formula:

$$P_{F,n}^{k}=1/kP_{n}^{k}.$$

Method Optimality

The fact that the mean estimate $\hat{y}_{F,n}^{k,l}$ is an optimum estimate of the state vector y of the system is mathematically justified hereinafter, in a slightly simplified case for which the different inertial measurement units are placed at a same point, and have the same direction relative to each other.

To show that the mean estimate $\hat{y}_{F,n}^{k,l}$ is optimum, it is compared with a reference estimate, which is known to be optimum.

The reference estimate is an estimate that would be obtained by the following operations:
   previous fusion of the acceleration and angular speed signals coming from the k inertial measurement units considered herein (those involved in the obtaining of the mean estimate $\hat{y}_{F,n}^{k,l}$), to obtain three acceleration signals and three angular speed signals fused together, then
   filtering of the fused acceleration and angular speed signals, by means of an individual Kalman filter (receiving as an input the measurements $mes_n$ provided by the common sensors, in addition to the above-mentioned fused signals).

This latter Kalman filter receives fused signals, coming in a way from a virtual ("fused") inertial measurement unit, which is more accurate than one of the inertial measurement units considered alone. It provides:
   a first reference estimate $\hat{y}_{REF,n}^{k,l}$ of the state vector y of the system,
   a reference estimated error $\hat{x}_{REF,n}^{k,l}$ (estimate of the deviation between the state vector y and the first reference estimate $\hat{y}_{REF,n}^{k,l}$ of this vector), and
   a reference estimate $P_{REF,n}$ of a covariance matrix of the deviation $x_{REF}$ between the state vector y and the first reference estimate $\hat{y}_{REF,n}^{k,l}$ of this vector.

The inertial measurement units are supposed to have the same signal-to-noise ratio. The Kalman filter associated with the virtual inertial measurement unit mentioned hereinabove must then be set with:
   a covariance matrix of the external propagation noises $Q_{REF,n}^{e}$ equal to:

$$Q_{REF,n}^{e}=Q_{n}^{e}$$

a covariance matrix of the specific propagation noises $Q_{REF,n}^{s}$ equal to:

$$Q_{REF,n}^{s}=Q_{n}^{s}/k, \text{ and with}$$

an initial estimate $P_{o,REF}$ of the covariance matrix of the error vector $x_{REF}$ equal to:

$$P_{0,REF}=\begin{pmatrix} P_0^e & 0 \\ 0 & P_0^s/k \end{pmatrix}$$

(which translates that the virtual inertial measurement unit is in a way $\sqrt{k}$ times more accurate than one of the inertial measurement units considered alone).

It is known that the quantity $\hat{y}_{REF,n}^{k,l}+\hat{x}_{REF,n}^{k,l}$, determined by this Kalman filter, is the optimum estimate of the state vector y of the system.

We will now show, by recurrence, that the mean estimate $\hat{y}_{F,n}^{k,l}$ is, at each calculation step, equal to the reference estimate $\hat{y}_{REF,n}^{k,l}+x_{REF,n}^{k,l}$ and that it is hence also optimum.

Taking into account the linearity of the operation of projection of the corrected estimates in the common reference system, the mean estimate $\hat{y}_{F,n}^{k,l}$ may also be written as:

$$\hat{y}_{F,n}^{k,l}=\hat{y}_{F,uncorr,n}^{k,l}+\hat{x}_{F,n}^{k,l}$$

where $$\hat{y}_{F,uncorr,n}^{k,l}=\frac{1}{k}\sum_{E^l}\hat{y}_{n}^{k,i}(u)$$

and where $$\hat{x}_{F,n}^{k,l}=\frac{1}{k}\sum_{E^l}\hat{x}_{n}^{k,i}(u).$$

To simplify, let suppose that the estimated errors $\hat{x}_{n}^{k,i}$ are simultaneously reset for all the navigation filters considered.

Just after this resetting, at the initial calculation step n=0, the following equalities are hence verified: $\hat{y}_{F,uncorr,0}^{k,l}=\hat{y}_{REF,0}^{k,l}$ and $\hat{x}_{F,0}^{k,l}=\hat{x}_{REF,0}^{k,l}$. Moreover, it is noted that $P_{F,0}^{k,l}=P_{0,REF}$.

The hypothesis of recurrence is that, at the calculation step n−1, the following equalities are verified: $\hat{y}_{F,uncorr,n-1}^{k,l}=\hat{y}_{REF,n-1}^{k,l}$, $\hat{x}_{F,n-1}^{k,l}=\hat{x}_{REF,n-1}^{k,l}$, and $P_{F,n-1}^{k,l}=P_{REF,n-1}$.

It is then shown that these equalities are still true at the calculation step n.

As for the first estimates $\hat{y}_{F,uncorr,n}^{k,l}$ and $\hat{y}_{REF,n}^{k,l}$ (obtained by time integration of the acceleration and angular speed signals), they are independent of the navigation filter considered; they depend only on the prior estimates and on the acceleration and angular speed signals. Herein, this latter dependence to the linear type. We hence have $\hat{y}_{F,uncorr,n}^{k,l}=\hat{y}_{REF,n}^{k,l}$.

Moreover, taking into account:
   the propagation equations fulfilled by the estimated errors $\hat{x}_{n}^{k,i}$,
   the linearity of the operations of projection in the common reference system and of fusion,
   and due to the fact that the inertial measurement units are supposed to be collocated, and of same signal-to-noise ratio,
the estimated mean error $\hat{x}_{F,n}^{k,l}$, and the estimate $P_{F,n}^{k,l}$ of its covariance matrix follow the following propagation equations:

$$\hat{x}_{F,n}^{k,l}=F_{n}\hat{x}_{F,n-1}^{k,l}, \text{ and}$$

$$P_{F,n}^{k,l}=F_{n}P_{F,n-1}^{k,l}F_{n}^{T}+Q_{n,aug}^{e}/k+Q_{n}^{s}/k.$$

Now, the reference estimated error $\hat{x}_{REF,n}^{k,l}$ and the estimate $P_{REF,n}$ Of its covariance matrix satisfy the following propagation equations:

$$\hat{x}_{REF,n\_}=F_{n}\hat{x}_{REF,n-1}^{k,l}, \text{ and}$$

$$P_{REF,n\_}=F_{n}P_{REF,n-1}F_{n}^{T}+Q_{REF,n}^{e}+Q_{REF,n}^{s}.$$

The covariance matrix $Q_{REF,n}^{e}$ of the external propagation noise of the (fused) virtual inertial measurement unit is equal to $Q_n^e$, and is hence equal to $Q_{n,aug}^e/k$. The covariance matrix $Q_{REF,n}^s$ of the specific propagation noise is equal to $Q_n^s/k$.

The propagation equations are hence identical for $\hat{x}_{F,n}^{k,l}$ and $P_{F,n}^{k,l}$ on the one hand, and for $\hat{x}_{REF,n}^{k,l}$ and $P_{REF,n}$ on the other hand.

The recurrence hypothesis is hence preserved by the propagation step.

The updating step will now be considered.

For each "k-fusionable" navigation filter, the innovation covariance matrix $S_n$ is calculated, at the calculation step n, in accordance with the following formula: $S_n = H_n P_{n_-}^{k,l} H_n^T + k \cdot R_n$.

As a consequence, $S_n = k \cdot (H_n P_{REF,n_-} H_n^T + R_n) = k \cdot S_{REF,n}$.

The correction gain $K_n$, determined by each "k-fusionable" navigation filter may hence be expressed as follows:

$$K_n = P_{n_-}^{k,l} H_n^T S_n^{-1} = (k \cdot P_{REF,n_-}) H_n^T (k \cdot S_{REF,n})^{-1} = P_{REF,n_-} H_n^T S_{REF,n}^{-1} = K_{REF,n}$$

The correction gain $K_n$, determined by each "k-fusionable" navigation filter is hence equal to the correction gain $K_{REF,n}$ determined by the Kalman filter associated with the virtual inertial measurement unit.

Taking into account:
the updating equations satisfied by the estimated errors $\hat{x}_n^{k,i}$, and
the linearity of the operations of projection in the common reference system and of fusion,
the estimated mean error $\hat{x}_{F,n}^{k,l}$ and the estimate $P_{F,n}^{k,l}$ of its covariance matrix follow the following updating equations:

$$\hat{x}_{F,n}^{k,l} = \hat{x}_{F,n_-}^{k,l} + K_n(mes_n - H_n[\hat{y}_{F,uncorr,n}^{k,l} + \hat{x}_{F,n}^{k,l}]), \text{ and}$$

$$P_{F,n}^{k,l} = (Id - K_n H_n) P_{F,n_-}^{k,l}.$$

The reference estimated error $\hat{x}_{REF,n}^{k,l}$ and the estimate $P_{REF,n}$ Of its covariance matrix fulfill the following updating equations:

$$\hat{x}_{REF,n}^{k,l} = \hat{x}_{REF,n_-}^{k,l} + K_{REF,n}(mes_n - H_n [\hat{y}_{REF,n}^{k,l} + \hat{x}_{REF,n_-}^{k,l}]), \text{ and}$$

$$P_{REF,n} = (Id - K_{REF,n} H_n) P_{REF,n_-}.$$

Now, it has been shown that $K_n = K_{REF,n}$ and that $\hat{y}_{F,uncorr,n}^{k,l} = \hat{y}_{REF,n}^{k,l}$.

The updating equations are hence identical for $\hat{x}_{F,n}^{k,l}$ and $P_{F,n}^{k,l}$ on the one hand, and for $\hat{x}_{REF,n}^{k,l}$ and $P_{REF,n}$ on the other hand.

The recurrence hypothesis is hence also preserved by the updating step.

By recurrence, it is hence finally deduced therefrom that the mean estimate $\hat{y}_{F,n}^{k,l}$, is, at each calculation step, equal to the reference estimate $\hat{y}_{REF,n}^{k,l} + \hat{x}_{REF,n}^{k,l}$ (that is the optimum estimate of the state vector y of the system), and that the estimate $P_{F,n}^{k,l}$ of the covariance matrix of its error is also the better estimate of this matrix.

The use of modified individual Kalman filters (with augmentation of the variances), followed with a fusion of the estimates, hence allows obtaining an estimate that is as good as if the acceleration and angular speed signals of several inertial measurement units where previously fused, before filtering them by means of a single individual Kalman filter.

It is reminded on that subject that the fact to make the filtering before the fusion allows having to implement only $N^2$ navigation filters (instead of $2^N-1$) to estimate the $2^N-1$ distinct mean estimations $\hat{y}_F^{k,l}$.

Finally, as regards the demonstration hereinabove, it is noted that a potential difference between the resetting thresholds of the estimated errors $\hat{x}_n^{k,i}$ has only a negligible influence (influence of order 2 or less, with respect to the corrective term mentioned hereinabove, for example) on the mean estimation $\hat{y}_{F,n}^{k,l}$ or on the covariance matrix that is associated therewith.

Adjustment Scenario for the External Sensors

It may occur that one of the external sensors C1, . . . Cp provides measurements of the positioning parameters of the system in an intermittent way (case of a sonar, for example), or only in certain circumstances (for example, if the positioning system equips a submarine, the GPS positioning system is available only when a submarine antenna is emerged or is located at the surface of the water).

One or several adjustment scenarios are hence to be defined. Each adjustment scenario is data of the time instants and methods of taking into account, by the navigation filters, of the measurements $mes_n$ provided by the common sensors C1, . . . , Cp.

An example of such an adjustment scenario is the following:
the measurements provided by the GPS positioning system are taken into account only from a given date $t_1$ (because they can be determined by the GPS system only after this date), and
the measurements provided by another of one of the common sensors, made by means of an electromagnetic loch, are permanently taken into account (at each calculation step) by the navigation filters.

To improve the robustness of the positioning system 1 with respect to a failure or a potential unavailability of one of the common sensors, it may be provided that the processing unit 10 determines the $2^N-1$ mean estimates in parallel for M different adjustment scenarios Sc1, . . . , ScM (FIG. 2). The processing unit 10 comprises in this case $M \times N^2$ independent navigation filters (and determines $M \times (2^N-1)$ distinct mean estimates).

For each adjustment scenario, within each set of navigation filters $F^k$, $1 \leq k \leq N$ (for example, within the set $F^N$ of the "N-fusionable" navigation filters), the measurements provided by the common sensors are taken into account in the same way by the different navigation filters $F_1^k, \ldots, F_i^k, \ldots, F_N^k$ of said set $F^k$. Thanks to this arrangement, the mean estimates $\hat{y}_F^{k,l}$ keep their optimum (or almost-optimum) character.

Example of Results

FIGS. 5 to 8 schematically show the evolution over time t of different estimations of the latitude of a ship 2, determined by the positioning system 1 described hereinabove, for an example of navigation phase, in the case where the number N of inertial measurement units of the system is equal to 3.

During this navigation phase, the common sensors used are:
an electromagnetic loch, which provides measurements all along this navigation phase, and
the GPS positioning system, which is operational only during a short time interval, located about at the first third of this navigation phase (the beginning of this interval is indicated in these figures by the arrow denoted "GPS").

FIG. 5 shows (in arbitrary units) the time evolution of:
the estimated errors $\hat{x}^{1,1}(u)$, $\hat{x}^{1,2}(u)$, $\hat{x}^{1,3}(u)$ (projected in the common reference system), determined by the 3

"1-fusionable" conventional navigation filters, from the signals respectively provided by the three inertial measurement units $U_1$, $U_2$ and $U_3$, the estimated errors $\hat{x}^{3,1}(u)$, $\hat{x}^{3,2}(u)$, $\hat{x}^{3,3}(u)$ (projected in the common reference system), determined by the 3 "3-fusionable" navigation filters, from the signals respectively provided by the three inertial measurement units $U_1$, $U_2$ and $U_3$, and the mean estimated error $\hat{x}_F^3$ obtained by fusion of the three estimated errors $\hat{x}^{3,1}(u)$, $\hat{x}^{3,2}(u)$, $\hat{x}^{3,3}(u)$.

The respective standard deviations of the estimated errors $\hat{x}^{1,1}(u)$, $\hat{x}^{1,2}(u)$, $\hat{x}^{1,3}(u)$, $\hat{x}^{3,1}(u)$, $\hat{x}^{3,2}(u)$, $\hat{x}^{3,3}(u)$ and $\hat{x}_F^3$ are noted $\sigma^{1,1}$, $\sigma^{1,2}$, $\sigma^{1,3}$, $\sigma^{3,1}$, $\sigma^{3,2}$, $\sigma^{3,3}$ and $\sigma_F^3$. Their time evolution is schematically shown in FIG. 6, for a same navigation phase. The values of these standard deviations are obtained directly from the corresponding covariance matrices $P_n^{1,i}$, $P_n^{3,i}$ and $P_{F,n}^{3,I}$. Herein, the index i varies from 1 to 3 and the index I takes a single value: there is only one 3-filter fusion when there are 3 inertial measurement units.

FIGS. 7 and 8 are detail views, respectively of FIGS. 5 and 6, showing in more detail a part of the navigation phase considered, this part comprising the time interval during which the GPS positioning system is operational.

It is observed, on this navigation phase example, that:

the mean estimated error $\hat{x}_F^3$, obtained by fusion of the three "3-fusionable" estimated errors $\hat{x}^{3,1}(u)$, $\hat{x}^{3,2}(u)$, $\hat{x}^{3,3}(u)$, provides a latitude estimate that is better than those, $\hat{x}^{1,1}(u)$, $\hat{x}_{1,2}(u)$, $\hat{x}^{1,3}(u)$, which are obtained on the basis of a single inertial measurement unit;

the standard deviation $\sigma_F^3$ of the latitude estimation of the fused navigation solution $\hat{x}_F^3$ is better than (i.e. lower than) those, $\sigma^{1,1}$, $\sigma^{1,2}$, $\sigma^{1,3}$ obtained on the basis of a single inertial measurement unit; however, when the measurements provided by the GPS positioning system are available, these different standard deviations have very close values; indeed, this is the GPS positioning system that then contributes to the essential of the latitude estimation, and having either 1 or 3 inertial measurement units not much changes the quality of the estimation; this illustrates that the estimation method used suitably takes into account the correlations between estimated errors that could be induced by the measurements provided by the common sensors;

the different standard deviations $\sigma^{1,1}$, $\sigma^{1,2}$, $\sigma^{1,3}$ of the estimates provided by the "1-fusionable" navigation filters are equal to each other, or at least very close to each other (in FIGS. 6 and 8, the three corresponding curves are superimposed to each other), and it is the same for the standard deviations, $\sigma^{3,1}$, $\sigma^{3,2}$, $\sigma^{3,3}$ of the estimates provided by the "3-fusionable" navigation filters; this validates the hypothesis according to which the inertial measurement units can, as regards the calculation of the covariance matrices of the errors and of the correction gains, be considered as being co-located;

the standard deviations $\sigma^{3,1}$, $\sigma^{3,2}$, $\sigma^{3,3}$ of the estimates provided by the "3-fusionable" navigation filters are far higher than the standard deviations $\sigma^{1,1}$, $\sigma^{1,2}$, $\sigma^{1,3}$ of the estimates provided by the "1-fusionable" navigation filters (in particular, when the GPS positioning system is operational), which is coherent with the covariance augmentation applied;

before fusion, the estimated errors $\hat{x}^{3,1}(u)$, $\hat{x}^{3,2}(u)$, $\hat{x}^{3,3}(u)$ provided by the three "3-fusionable" filters are higher than those provided by the "1-fusionable" filters, and are hence considered as less good (herein non-optimum); they however have a quality close to those provided by the "1-fusionable" filters, especially in prolonged absence of measurement provided by the GPS positioning system;

for each of the estimated errors considered hereinabove, the values taken by the estimated error are coherent with those of the corresponding standard deviation.

Error Detection Module

The processing unit 10 can, as herein, comprise an optional error detection module for automatically detecting a potential failure of one of the inertial measurement units.

The error detection module is configured so as, for each couple of 2 inertial measurement units $U_i$ and $U_j$, to:

calculate a difference $r_n^{ij}$ between the corrected estimates $\hat{y}_{cor,n}^{1,i}(u)$, $\hat{y}_{cor,n}^{1,j}(u)$ of the state vector y, respectively provided by the two "1-fusionable" navigation filters $F^1_i$ and $F^1_j$, associated with the couple of inertial measurement units $U_i$ and $U_j$, determine an expected covariance matrix $M_n^k$ for said difference $r_n^{ij}$, test by means of a statistic test, herein a khi2 test, if said difference $r_n^{ij}$ is compatible, or incompatible, with said expected covariance matrix $M_n^k$, and in case of incompatibility, determine that an error has occurred in the operation of one of said two inertial measurement units.

The difference $r_n^{ij}$ is determined more accurately by calculating the difference between truncated versions $\widehat{ye}_{cor,n}^{1,i}$ and $\widehat{ye}_{cor,n}^{1,j}$ of the corrected estimates $\hat{y}_{cor,n}^{1,i}(u)$ and $\hat{y}_{cor,n}^{1,j}(u)$, as explained hereinafter.

The corrected estimate $\hat{y}_{cor,n}^{1,i}(u)$ is a vector of dimension $d=d_e+d_s$, whose index coordinates $l=1, \ldots, d_e$ are the estimates of the different navigation magnitudes (latitude, longitude, ... ) and environment magnitudes, common to all the inertial measurement units, and the following $d_s$ coordinates of which are proper to the inertial measurement unit $U_i$ (bias and scale factor of this inertial measurement unit).

The restriction of the corrected estimation $\hat{y}_{cor,n}^{1,i}(u)$ to its first $d_e$ coordinates is noted $\widehat{ye}_{cor,n}^{1,i}$, and the difference vector $r_n^{ij}$ is equal to:

$$r_n^{ij} = \widehat{ye}_{cor,n}^{1,j} - \widehat{ye}_{cor,n}^{1,i}.$$

Comparably:

the covariance matrix $P_n^{1,i}(u)$ of the error associated with the corrected estimate $\hat{y}_{cor,n}^{1,i}(u)$, once restrained to its first block of size $d_e \times d_e$, is noted $Pe_n^{1,i}$, and the covariance matrix of the error associated with the corrected estimate $\hat{y}_{cor,n}^{k,i}(u)$, once restricted to its first block of size $d_e \times d_e$, is noted $Pe_n^{k,i}$.

Remarkably, the expected covariance matrix $M_n^k$ is determined as follows:

$$\text{for } k = 1: M_n^1 = Pe_n^{1,i} + Pe_n^{1,j}, \text{ and}$$

$$\text{for } k > 1: M_n^k = Pe_n^{1,i} + Pe_n^{1,j} - \frac{1}{k-1}(Pe_n^{k,i} + Pe_n^{k,j} - Pe_n^{1,i} - Pe_n^{1,j}).$$

The integer number k plays the role of an adjustable parameter, allowing adjusting the sensitivity of the error detection module. The value of the number k is fixed as a function of the desired detection sensitivity.

Indeed, the matrix $M_n^k$ depends on the value chosen for k, and the smaller this matrix, the more sensitive the error detection.

For k=1, the potential correlations between the two corrected estimates $\hat{y}_{cor,n}^{1,i}(u)$ and $\hat{y}_{cor,n}^{1,j}(u)$ are not taken into account in the calculation of the covariance matrix $M_n^k$ (because $M_n^1 = Pe_n^{1,i} + Pe_n^{1,j}$), and its corrected estimates are then considered as independent from each other.

For k>1, these correlations are taken into account, via the term $$\frac{1}{k-1}(Pe_n^{k,i} + Pe_n^{k,j} - Pe_n^{1,i} - Pe_n^{1,j}),$$

which allows reducing the values of the matrix $M_n^k$, and making the test advantageously more sensitive than a test that would ignore the existence of these correlations.

It will be noted that, even for k>1, the variance of the difference vector $r_n^{ij}$ is lower than the matrix $M_n^k$ (if the inertial measurement units $U_i$ and $U_j$ have rather close signal-to-noise ratios).

The compatibility of the difference vector $r_n^{ij}$ with the expected covariance matrix $M_n^k$ for this vector may then be wholly tested, by considering all the coordinates of this vector (of size $d_e$).

In this case, the quantity $(r_n^{ij})^T \cdot (M_n^k)^{-1} \cdot r_n^{ij}$ r is calculated. If this quantity is higher than or equal to $\chi^2(d_e)_{1-\alpha}$, the difference vector $r_n^{ij}$ is considered as incompatible with the estimate $M_n^k$ of its covariance matrix, and it is determined that one of the inertial measurement units of the couple $U_i$, $U_j$ is defective (at this step, it is not necessarily known if either one or both of the inertial measurement units of this couple are defective).

On the contrary, if the quantity $(r_n^{ij})^T \cdot (M_n^k)^{-1} \cdot r_n^{ij}$ turns out to be lower than $\chi^2(d_e)_{1-\alpha}$, the operation of each of the two inertial measurement units $U_i$ and $U_j$ is declared as being normal (non-defective).

$\chi^2(d_e)_{1-\alpha}$ is the quantile of order $1-\alpha$ of the $\chi^2$ law at $d_e$ degrees of freedom.

It may be mathematically shown that this compatibility test, which is originally based on said covariance matrix $M_n^k$, has a false alarm probability lower than or equal to the parameter a (which shows the relevance of this test, based on the comparison of the matrix $M_n^k$ with the khi2 coefficients mentioned hereinabove). The parameter a may for example be chosen equal to 1%, or to 5%.

The statistic test mentioned hereinabove may also be applied to the non-truncated difference vector, equal to $\hat{y}_{cor,n}^{1,i}(u) - \hat{y}_{cor,n}^{1,j}(u)$, with the expected covariance matrix given by the following formula $$M_n^k = P_n^{1,i} + P_n^{1,j} - \frac{1}{k-1}(P_n^{k,i} + P_n^{k,j} - P_n^{1,i} - P_n^{1,j})$$

The statistic test mentioned hereinabove may also be applied to another truncation of the difference vector, with the corresponding truncation for the expected covariance matrix.

The statistic test mentioned hereinabove may also be applied to the residue vector $r_n^{ij}$, coordinate by coordinate, instead of wholly testing the compatibility of this vector with the expected covariance matrix $M_n^k$.

In this case, for each coordinate (in other word, for each component) $r_n^{ij}(l)$ of index l comprised between 1 and $d_e$, the quantity $M_n^k(l,l)^{-1} \cdot r_n^{ij}(l)^2$ is calculated, and if it is higher than or equal to $\chi^2(1)_{1-\alpha}$, it is determined that one of the inertial measurement units of the couple $U_i$, $U_j$ is defective.

On the contrary, if the quantity $M_n^k(l,l)^{-1} \cdot r_n^{ij}(l)^2$ is lower than $\chi^2(1)_{1-\alpha}$ for each component of the residue vector, the operation of each of the two inertial measurement units $U_i$ and $U_j$ is declared as being normal.

This compatibility test is performed for all the couples of two inertial measurement units $U_i$, $U_j$, i.e., for $N \cdot (N-1)/2$ distinct couples of two inertial measurement units. Based on all the results of these tests, the defective inertial measurement units are identified. More precisely, one of the measurement units is identified as being defective if, for all the couples comprising this measurement unit, the above-mentioned test of compatibility indicates that the error vector $r_n^{ij}$ is incompatible with the estimate $M_n^k$ of its covariance matrix.

Setting of the Error Detection Module

FIGS. 9 and 10 show the evolution over time t of the quantities $\sqrt{M_n^1(1,1)}$, $\sqrt{M_n^2(1,1)}$ and $\sqrt{M_n^3(1,1)}$ (i.e. for k=1, 2 and 3), for the coordinate of index l that is the latitude of the ship, the positioning system comprising N=3 inertial measurement units (in FIGS. 9 and 10, these three quantities are respectively noted $\sigma_M^1$, $\sigma_M^2$ et $\sigma_M^3$, to lighten the notation).

During the navigation phase shown in FIG. 10, the common sensors that are used are:
- an electromagnetic loch, which provides measurements all along this navigation phase, and
- the GPS positioning system, which is operational only during a short time interval (the beginning of this interval is indicated in FIGS. 9 and 10 by the arrow denoted "GPS").

FIG. 10 is a detailed view of FIG. 9, showing in more detail a part of the considered navigation phase (this part comprising the time interval during which the GPS positioning system is operational).

It is observed in this navigation phase example that:
- when the correlations between navigation filters are strong (when the GPS positioning system is operational), the technique for taking these correlations into account in the matrix $M_n^k$, described hereinabove, effectively makes it possible to very strongly reduce (herein by a factor 6) the estimate of the standard deviation of the difference between two latitude estimates determined by two different inertial measurement units;
- the standard deviation $\sqrt{M_n^k(1,1)}$ is effectively smaller for k=2 or 3 than for k=1; and
- the standard deviation $\sqrt{M_n^k(1,1)}$ has close values for k=2 and for k=3.

In practice, the error detection module is hence preferably set by choosing for k a fixed value, comprised between 2 and N.

Simplified Architecture of the System

Different variants of the just-described positioning system 1 may be provided.

For example, in a simplified variant, the positioning system according to the invention may comprise only the N "N-fusionable" navigation filters (and the corresponding fusion module $F_{us}^N$), instead of the $N^2$ navigation filters of the embodiment described hereinabove. In this case, in addition to the mean estimation $y_F^N$ (which is optimum), it may be provided to calculate additional mean estimates by averaging between each other only a part of the projected estimates $\hat{y}_{cor,n}^{N,1}(u), \ldots, \hat{y}_{cor,n}^{N,i}(u), \ldots, \hat{y}_{cor,n}^{N,N}(u)$ provided by the "N-fusionable" navigation filters. These additional mean estimates are suboptimum, but however useful (in this simplified variant) in terms of robustness, in the case where one the inertial measurement units turns out to be defective.

In another simplified variant, the positioning system according to the invention may comprise only (instead of the $N^2$ navigation filters of the complete embodiment described hereinabove):

the N "N-fusionable" navigation filters and the corresponding fusion module $F_{us}^N$, and the N "1-fusionable" navigation filters, so as to implement the error detection module described hereinabove.

The invention claimed is:

1. A positioning system comprising:
a plurality of inertial measurement devices, each of the inertial measurement devices comprising at least one inertial sensor, accelerometer or gyrometer that is configured to provide an inertial signal representative of an acceleration or an angular speed of rotation of the measurement device;
at least one common sensor configured to provide a measurement of a positioning parameter (y) of the positioning system, said measurement being affected by a measurement noise;
an electronic processor comprising, for each inertial measurement device, an individual navigation filter that is a Kalman filter, the individual navigation filter being configured to:
a) determine an estimate ($\hat{y}^{k,i}$) of said positioning parameter (y), based on the inertial signal provided by said inertial measurement device, and
b) determine a corrected estimate $\hat{y}_{cor}^{k,i}$ of said positioning parameter by adding a corrective term to said first estimate ($\hat{y}^{k,i}$), the corrective term being equal to a correction gain ($K_n$) multiplied by a difference between said measurement of the positioning parameter (y) of the positioning system, and the product of a measurement matrix ($H_n$) multiplied by said estimate of the positioning parameter or multiplied by a sum of said first estimate ($\hat{y}^{k,i}$) and of an estimated error ($\hat{x}_{n\_}^{k,i}$) affecting said first estimate ($\hat{y}^{k,i}$), the measurement matrix ($H_n$) representing a manner in which said measurement depends on the positioning parameter (y) of the system, the correction gain ($K_n$) being determined as a function of an augmented variance ($V_{aug}$) that is higher than a variance of the measurement noise of the common sensor; and
at least one fusion module configured to determine a mean estimate ($\hat{y}_F^{k,l}$) of said positioning parameter (y) of the positioning system by calculating a mean of a specific number (k) of said corrected estimates ($\hat{y}_{cor}^{k,i}$) of the positioning parameter, said specific number (k) being higher than or equal to two and lower than or equal to the number (N) of inertial measurement devices that are included in the positioning system,
wherein the system is configured so that each of the individual navigation filters executes several times, successively, all the steps a) and b) without taking into account said mean estimate ($\hat{y}_F^{k,l}$) determined by the fusion module, and
wherein the positioning system is configured to determine a position of a vehicle equipped with the positioning system.

2. The positioning system according to claim 1, wherein a relative deviation, between the respective signal-to-noise ratios of any two of said inertial signals respectively provided by said inertial measurement devices units, is lower than 30%.

3. The positioning system according to claim 2, wherein a relative deviation between said augmented variance ($V_{aug}$) and an optimum augmented variance is lower than 30%, said optimum augmented variance being equal to the variance of the measurement noise of the common sensor multiplied by the specific number (k) of said corrected estimates ($\hat{y}_{cor}^{k,i}$) of said positioning parameter, the mean of the specific number being calculated by the fusion module to determine said mean estimate ($\hat{y}_F^{k,l}$).

4. The positioning system according to claim 3, wherein the individual navigation filters are modified Kalman filters, each of the modified Kalman filters being configured to:
estimate a covariance matrix $P_n^{k,i}$ of a deviation (x) between said estimate ($\hat{y}^{k,i}$) of the positioning parameter of the positioning system and the positioning parameter (y), and
determine said correction gain ($K_n$) so that the correction gain has, with an optimum gain ($K_{n,\ opt}$), a relative deviation lower than 30%,
said optimum gain ($K_{n,\ opt}$) being equal to the following quantity: $P_n^{k,i}, H_n^T S_n^{-1}$, where $H_n T$ is the transposed matrix of the measurement matrix $H_n$, and where $S_n^{-1}$ is the inverse of an innovation covariance matrix $S_n$ equal to $H_n P_n^{k,i}, H_n^T V_{aug}$, $V_{aug}$ being said augmented variance.

5. The positioning system according to claim 2, wherein the individual navigation filters are modified Kalman filters, each of the modified Kalman filters being configured to:
estimate a covariance matrix $P_n^{k,i}$ of a deviation (x) between said estimate ($\hat{y}^{k,i}$) of the positioning parameter of the positioning system and the positioning parameter (y), and
determine said correction gain ($K_n$) so that the correction gain has, with an optimum gain ($K_{n,\ opt}$), a relative deviation lower than 30%,
said optimum gain ($K_{n,\ opt}$) being equal to the following quantity: $P_{in}^{k,i}, H_n^T S_n^{-1}$, where $H_n^T$ is the transposed matrix of the measurement matrix $H_n$, and where $S_n^{-1}$ is the inverse of an innovation covariance matrix $S_n$ equal to $H_n P_n^{k,i}, H_n^T V_{aug}$, $V_{aug}$ being said augmented variance.

6. The positioning system according to claim 1, wherein a relative deviation between said augmented variance ($V_{aug}$) and an optimum augmented variance is lower than 30%, said optimum augmented variance being equal to the variance of the measurement noise of the common sensor multiplied by the specific number (k) of said corrected estimates ($\hat{y}_{cor}^{k,i}$) of said positioning parameter, the mean of the specific number being calculated by the fusion module to determine said mean estimate ($\hat{y}_F^{k,l}$).

7. The positioning system according to claim 6, wherein the individual navigation filters are modified Kalman filters, each of the modified Kalman filters being configured to:
estimate a covariance matrix $P_n^{k,i}$ of a deviation (x) between said estimate ($\hat{y}^{k,i}$) of the positioning parameter of the positioning system and the positioning parameter (y), and
determine said correction gain ($K_n$) so that the correction gain has, with an optimum gain ($K_{n,\ opt}$), a relative deviation lower than 30%,
said optimum gain ($K_{n,\ opt}$) being equal to the following quantity: $P_n^{k,i}, H_n^T S_n^{-1}$, where $H_n^T$ is the transposed matrix of the measurement matrix $H_n$, and where $S_n^{-1}$ is the inverse of an innovation covariance matrix $S_n$ equal to $H_n P_n^{k,i} H_n^T V_{aug}$, $V_{aug}$ being said augmented variance.

8. The positioning system according to claim 1, wherein the individual navigation filters are modified Kalman filters, each of the modified Kalman filters being configured to:
   estimate a covariance matrix $P_n^{k,i}$ of a deviation (x) between said estimate ($\hat{y}^{k,i}$) of the positioning parameter of the positioning system and this the positioning parameter (y), and
   determine said correction gain ($K_n$) so that the correction gain has, with an optimum gain ($K_{n,\ opt}$), a relative deviation lower than 30%,
   said optimum gain ($K_{n,\ opt}$) being equal to the following quantity: $P_n^{k,i} H_n^T S_n^{-1}$, where $H_n^T$ is the transposed matrix of the measurement matrix $H_n$, and where $S_n^{-1}$ is the inverse of an innovation covariance matrix $S_n$ equal to $H_n P_n^{k,i} H_n^T V_{aug}$, $V_{aug}$ being said augmented variance.

9. The positioning system according to claim 8, wherein each of the individual navigation filter is configured so that, during a first execution of step a), the covariance matrix $P_n^{k,i}$ of the deviation (x) between said estimate ($\hat{y}^{k,i}$) of the positioning parameter of the positioning system and the positioning parameter (y), is estimated as a function of an initial covariance matrix ($P_0^{k,i}$) and of a propagation noise matrix (Q) comprising at least:
   a first component ($Q^s$), representative of the variance of a noise affecting the inertial signal provided by the inertial measurement device unit associated with said individual navigation filter, and
   a second component ($Q_{aug}^e$, representative of a corrected variance that is associated with external noises independent of said inertial measurement device, said corrected variance being higher than and proportional to the variance ($Q^e$) of said external noises.

10. The positioning system according to claim 8, further comprising, for each inertial measurement device, a conventional Kalman filter ($F_i^1$) configured to:
   determine an additional estimate ($\hat{y}^{1,i}$) of said positioning parameter (y) of the positioning system, based on the inertial signal provided by said inertial measurement device,
   estimate an additional covariance matrix $P_n^{1,i}$ of a deviation (x) between said additional estimate ($\hat{y}^{1,i}$) and said positioning parameter (y) of the system, and
   determine a corrected additional estimate $\hat{y}_{cor}^{1,i}$ of said positioning parameter by adding, to said previously-determined additional estimate ($\hat{y}^{1,i}$), a corrective term equal to an additional correction gain multiplied by a difference between said measurement of the positioning parameter (y) of the positioning system and the product of the measurement matrix ($H_n$) multiplied by said additional estimate or multiplied by a sum of said additional estimate ($\hat{y}^{1,i}$) and of an additional estimated error ($\hat{x}_n^{1,i}$) affecting said additional estimate ($\hat{y}^{1,i}$), the additional correction gain being determined as a function of the variance of the measurement noise of the common sensor.

11. The positioning system according to claim 10, further comprising an error detector configured, for at least two of said inertial measurement devices, to:
   calculate a difference ($r_n^{ij}$) between the two corrected additional estimates ($\hat{y}_{cor,n}^{1,i}$, $\hat{y}_{cor,n}^{1,j}$) of the positioning parameter that are respectively determined based on the inertial signals provided by the two inertial measurement devices, determine an expected covariance matrix ($M_n^k$) for said difference ($r_n^{ij}$), as a function of the additional covariance matrices $P_n^{1,i}$ of the two additional estimates ($\hat{y}^{1,i}$, $\hat{y}^{1,j}$) that have been respectively determined based on the inertial signals provided by said two inertial measurement devices, and as a function of the covariance matrices $P_n^{k,i}$ et $P_n^{k,j}$ of the two estimates ($\hat{y}^{k,i}$, $\hat{y}^{k,j}$) of the positioning parameter that have been respectively determined based on the same inertial signals,
test, a statistic test, whether or not said difference is compatible, or incompatible, with said expected covariance matrix ($M_n^k$), and
in case of incompatibility, determine that an error has occurred in the operation of one of said two inertial measurement devices.

12. The positioning system according to claim 11, wherein said statistic test is a khi2 test, and
   wherein the expected covariance matrix ($M_n^k$) is determined as a function of a corrected covariance matrix equal to:

$$P_n^{1,i} + P_n^{1,j} - \frac{1}{k-1}(P_n^{k,i} + P_n^{k,j} - P_n^{1,i} - P_n^{1,j})$$

where k is the number of estimates ($\hat{y}_{cor}^{k,i}$) of the positioning parameter (y) having a mean calculated by the fusion module ($F_{us}^k$) to determine said mean estimate ($\hat{y}_F^{k,i}$).

13. The positioning system according to claim 8, wherein the fusion module is configured to determine an estimate of a covariance matrix ($P_F^{k,i}$) of said mean estimate ($\hat{y}_F^{k,i}$), as a function of:
   an arithmetic mean of said covariance matrices $P_n^{k,i}$, respectively associated with said corrected estimates ($\hat{y}_{cor}^{k,i}$) of the positioning parameter having the mean calculated by the fusion module to determine said mean estimate ($\hat{y}_F^{k,l}$), or
   the inverse of an arithmetic mean of the inverses of said covariance matrices $P_n^{k,i}$ respectively associated with said corrected estimates ($\hat{y}_{cor}^{k,i}$) of the positioning parameter, having the mean calculated by the fusion module ($f_{us}^k$) to determine said mean estimate ($\hat{y}_F^{k,l}$).

14. The positioning system according to claim 1, wherein a relative deviation between two of said correction gains ($K_n$), respectively determined by any two of said individual navigation filters, is lower than 20%.

15. The positioning system according to claim 14, wherein the navigation filters ($F_i^k$) are synchronous, and wherein the respective correction gains ($K_n$) of the navigation filters are equal to a same common correction gain whose value is, at each repetition of step b), calculated only once for all said navigation filters.

16. The positioning system according to claim 1, wherein the inertial measurement devices are N in number, and
   wherein the fusion module is configured to:
      determine said mean estimate ($\hat{y}_F^{k,i}$) of the positioning parameter of the system by calculating the mean of a set of k corrected estimates ($\hat{y}_{cor}^{k,i}$) of said positioning parameter, among the N corrected estimates ($\hat{y}_{cor}^{k,1}$, $\hat{y}_{cor}^{k,i}$, $\hat{y}_{cor}^{k,N}$) of the positioning parameter (y) respectively determined by the individual navigation filters, the integer number k being lower than or equal to N, and
      determine at least one other mean estimate ($\hat{y}_F^{k,l}$) of the positioning parameter of the system, by calculating the mean of another set of k corrected estimates ($\hat{y}_{cor}^{k,i}$) of said positioning parameter among the N corrected estimates ($\hat{y}_{cor}^{k,1}$, $\hat{y}_{cor}^{k,i}$, $\hat{y}_{cor}^{k,N}$) of this the positioning parameter (y) respectively determined by the individual navigation filters.

17. The positioning system according to claim 16, wherein the fusion module is configured, for each set of k corrected estimates ($\hat{y}_{cor}^{k,i}$) of said positioning parameter among the N corrected estimates ($\hat{y}_{cor}^{k,1}$, $\hat{y}_{cor}^{k,i}$, $\hat{y}_{cor}^{k,N}$) of this the positioning parameter (y) determined by the individual navigation filters, to:
  determine a mean estimate ($\hat{y}_F^{k,l}$) the positioning parameter equal to the mean of the k corrected estimates ($\hat{y}_{cor}^{k,i}$) of the positioning parameter included in said set.

18. The positioning system according to claim 1, wherein said positioning parameter (y) comprises one of the following magnitudes:
  a longitude, a latitude, or an altitude locating the positioning system,
  a component of the speed of the positioning system with respect to the terrestrial reference system, and
  a heading angle, a roll angle or a pitch angle of the positioning system, with respect to the terrestrial reference system.

19. The positioning system according to claim 1, wherein each of the navigation filters is configured to determine an estimate of the state vector (y) of the system, one of the components of the state vector being said positioning parameter, another component comprising one of the following magnitudes:
  a longitude, a latitude, or an altitude locating the positioning system,
  a component of the speed of the positioning system with respect to the terrestrial reference system,
  a heading angle, a roll angle or a pitch angle of the positioning system, with respect to the terrestrial reference system,
  a bias of the accelerometer of one of the inertial measurement devices,
  a gravity anomaly,
  a speed of a sea current,
  a calibration parameter of said common sensor, and
  a deviation between one of the previous magnitudes and an estimate of said magnitude.

20. A method for positioning a system configured to determine a position of a vehicle equipped with the system, the method comprising:
  providing, by a plurality of inertial measurement devices of an electronic processor, an inertial signal representative of an acceleration or an angular speed of the measurement device;
  providing, by at least one common sensor, a measurement of a positioning parameter (y) of the system, said measurement being affected by a measurement noise;
  for each inertial measurement device,
  a) determining, by an individual navigation filter that is a Kalman filter, an estimate ($\hat{y}^{k,i}$) of said positioning parameter (y), based on the inertial signal provided by said inertial measurement device, and
  b) determining, by the individual navigation filter, a corrected estimate ($\hat{y}_{cor}^{k,i}$) of said positioning parameter by adding a corrective term to said first estimate ($\hat{y}^{k,i}$), the corrective term being equal to a correction gain ($K_n$) multiplied by a difference between said measurement of the positioning parameter (y) of the system, and the product of a measurement matrix ($H_n$) multiplied by said estimate of the positioning parameter or multiplied by a sum of said first estimate ($\hat{y}^{k,i}$) and of an estimated error ($\hat{x}_{n\_}^{k,i}$) affecting said first estimate ($\hat{y}^{k,i}$), the measurement matrix ($H_n$) representing a manner in which said measurement depends on the positioning parameter (y) of the system, the correction gain ($K_n$) being determined as a function of an augmented variance ($V_{aug}$) that is higher than a variance of the measurement noise of the common sensor; and
  determining, by at least one fusion module, a mean estimate ($\hat{y}_F^{k,l}$) of said positioning parameter (y) of the system by calculating a mean of a specific number (k) of said corrected estimates ($\hat{y}_{cor}^{k,i}$) of the positioning parameter, said specific number (k) being higher than or equal to two and lower than or equal to the number (N) of inertial measurement devices included in the system,
  wherein each of the individual navigation filters ($F_i^k$) executes several times, successively, all the steps a) and b) without taking into account said mean estimate ($\hat{y}_F^{k,l}$) determined by the fusion module, and
  wherein the positioning system is configured to determine a position of a vehicle equipped with the positioning system.

* * * * *